(12) United States Patent
Castanos et al.

(10) Patent No.: US 9,501,314 B2
(45) Date of Patent: Nov. 22, 2016

(54) REDUCING ABORTS CAUSED BY A RUNTIME HELPER CALLED DURING EXECUTION OF A TRANSACTION BLOCK

(71) Applicant: International Business Machines Corporation, Armonk, NY (US)

(72) Inventors: Jose G. Castanos, Yorktown Heights, NY (US); Takuya Nakaike, Tokyo (JP); Rei Odaira, Austin, TX (US); Peng Wu, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/769,739

(22) PCT Filed: Jan. 21, 2014

(86) PCT No.: PCT/JP2014/051051
§ 371 (c)(1),
(2) Date: Aug. 21, 2015

(87) PCT Pub. No.: WO2014/129247
PCT Pub. Date: Aug. 28, 2014

(65) Prior Publication Data
US 2016/0004557 A1    Jan. 7, 2016

(30) Foreign Application Priority Data
Feb. 22, 2013   (JP) .................................. 2013-033433

(51) Int. Cl.
*G06F 9/46*      (2006.01)
(52) U.S. Cl.
CPC ..................................... *G06F 9/467* (2013.01)
(58) Field of Classification Search
None
See application file for complete search history.

(56) References Cited

U.S. PATENT DOCUMENTS

2009/0172306 A1    7/2009   Nussbaum et al.
2009/0172317 A1*   7/2009   Saha ...................... G06F 9/3004
                                                        711/159

(Continued)

FOREIGN PATENT DOCUMENTS

CN     102893256 A    1/2013
EP     2 513 783      7/2011

(Continued)

OTHER PUBLICATIONS

PCT/JP2014/051051 International Search Report mailed Aug. 25, 2015.

(Continued)

*Primary Examiner* — Benjamin Wu
(74) *Attorney, Agent, or Firm* — Scully, Scott, Murphy & Presser, P.C.; Keivan Razavi, Esq.

(57) ABSTRACT

A system and method for reducing the number of aborts caused by a runtime helper being called during the execution of a transaction block. When a runtime helper is called during the execution of a transaction block while a program using hardware transactional memory is running, the runtime helper passes ID information indicating the type of runtime helper to an abort handler. When there is an abort caused by a call to a runtime helper, the abort handler responds by acquiring the ID information of the runtime helper that caused the abort, disables the transaction block with respect to a specific type of runtime helper, executes the non-transactional path corresponding to the transaction block, and re-enables the transaction block when predetermined conditions are satisfied.

20 Claims, 17 Drawing Sheets

(56) References Cited

U.S. PATENT DOCUMENTS

| | | |
|---|---|---|
| 2010/0131953 A1 | 5/2010 | Dice et al. |
| 2010/0186015 A1* | 7/2010 | Wang ............... G06F 9/467 718/101 |
| 2010/0332807 A1 | 12/2010 | Sheaffer et al. |
| 2011/0145552 A1 | 6/2011 | Yamada et al. |
| 2011/0153960 A1* | 6/2011 | Rajwar ............... G06F 9/466 711/154 |
| 2011/0296148 A1* | 12/2011 | Cain, III ............ G06F 9/30087 712/228 |
| 2012/0084477 A1* | 4/2012 | Arndt ............... G06F 9/466 710/266 |
| 2013/0339676 A1* | 12/2013 | Greiner ............... G06F 9/3861 712/220 |
| 2015/0278123 A1* | 10/2015 | Nayshtut ............... G06F 9/48 711/163 |

FOREIGN PATENT DOCUMENTS

| | | |
|---|---|---|
| JP | 2013-513885 A | 4/2013 |
| KR | 10-2012-010551 A | 9/2012 |
| KR | 10-20120105512 A | 9/2012 |
| WO | WO 2011/081704 A2 | 7/2011 |

OTHER PUBLICATIONS

PCT/JP2014/051051 International Search Report mailed Aug. 25, 2015—English language translation.

Dice et al., "Early Experience with a Commercial Hardware Transactional Memory Implementation", ASPLOS'09, Mar. 7-11, 20119, Washington, DC.

Wang et al., "Evaluation of Blue Gene/Q Hardware Support for Transactional Memories", PACT'12, Minneapolis, Minnesota, Sep. 2012.

Ansari et al., "Steal-on-abort: Dynamic Transaction Reordering to Reduce Conflicts in Transactional Memory", SHCMP 2008: First Workshop on Software and Hardware Challenges of Manycore Platforms (Jun. 2008).

International Search Report mailed Feb. 25, 2014.
International Search Report dated Jul. 2009.

\* cited by examiner (a)

(b)

REDUCING ABORTS CAUSED BY A RUNTIME HELPER CALLED DURING EXECUTION OF A TRANSACTION BLOCK

TECHNICAL FIELD

The present invention relates to a technique for reducing the number of aborts while running a program using hardware transactional memory (HTM), and more specifically to a technique for reducing the number of aborts caused by a predetermined function being called while a transaction block is being executed.

BACKGROUND ART

Shared-memory parallel programs in which threads executed in parallel share data are often used by multicore processors. One method used to prevent access conflicts is HTM. HTM is transactional memory implemented as hardware.

In HTM, each executed thread has a local copy, and the results of processing on the local copy are written conditionally when, at the end of processing, a shared resource value is not written by another thread. This processing is called a commit. The process itself is dropped when a shared resource value is written by another thread. Transactions are sometimes cancelled (aborted). When an abort occurs, any changes to a shared resource by the transaction are cancelled (rolled back). A transaction is a series of atomic processes executed by a single thread.

Commercial machines incorporating HTM have recently appeared on the market. HTM is used in a managed runtime environment such as a Java (registered trademark) virtual machine (VM) to optimize various items and operations, such as lock elision, partial inlining, speculative check elimination, and HTM-based concurrent libraries. A managed runtime environment relies on various runtime helpers such as JIT compilers and memory allocators. Here, runtime helpers are functions of virtual machines called by an interpreter or JIT-compiled executable code during runtime but are not included in the interpreter or JIT-compiled executable code. However, some runtime helpers cause an abort when called and run while a transaction is being executed.

Prior art techniques used to address aborts can be found in Patent Literature 1-3 and Non-patent Literature 1-3. Patent Literature 1 and Non-patent Literature 2 describe techniques in which an appropriate action is taken in the abort handler in response to abort information provided by the HTM hardware. Patent Literature 2 describes a technique in which a transaction is temporarily suspended while the transaction is being executed, some processing is performed, and the transaction is then restarted. Patent Document 3 describes a technique in which the implementation of a plurality of transactional memories is switched during runtime.

Non-patent Literature 1 describes a technique in which a non-transactional path is run after a transaction has been aborted and several retries attempted, followed by re-execution of the transaction. Non-patent Literature 3 describes delayed re-execution of transactions after an abort has occurred because of a conflict between transactions.

CITATION LIST

Patent Literature

Patent Literature 1: U.S. Patent Application Publication No. 2010/131953

Patent Literature 2: U.S. Patent Application Publication No. 2010/332807

Patent Literature 3: U.S. Patent Application Publication No. 2009/172306

Non-Patent Literature

Non-patent Literature 1:
Dave Dice, Yossi Lev, Mark Moir, Dan Nussbaum, "Early Experience with Commercial Hardware Transactional Memory Implementation", Sun Microsystems Technical Report TR-2009-180, 2009.

Non-patent Literature 2:
Amy Wang, Peng Wu, Matthew Gaudet, Jose Nelson Amaral, Martin Ohmacht, Christopher Barton, Raul Silvera, Maged Michael, "Evaluation of Blue Gene/Q Hardware Support for Transactional Memories", PACT 2012.

Non-patent Literature 3:
Mohammad Ansari, Mikiel Lujan, Chris Kirkham, Kim Jarvis, Christos Kotselidis, Ian Watson, "Steal-on-abort: Dynamic Transaction Reordering to Reduce Conflicts in Transactional Memory", 4th International ACM SIGPLAN Conference on High Performance Embedded Architectures and Compilers (HiPEAC '09), ACM Press, pp. 4-18, 2009.

DISCLOSURE OF INVENTION

Technical Problems

However, an abort caused by the calling of a runtime helper cannot be resolved simply by retrying a transaction.

For example, a JIT compiler is called when a method has been executed a predetermined number of times. When the call occurs during a transaction, the size of the workspace used by the JIT compiler exceeds the transaction size supported by the hardware, and an abort occurs.

In addition, symbol resolution and code patching resolve symbols on demand in a method during runtime, and code referring to the resulting symbols is patched. When symbol resolution occurs during a transaction, an abort occurs.

Also, thread-local heap (TLH) allocation is often called by a program, TLH is allocated from the heap, and this is cleared to zero. However, when TLH allocation occurs during a transaction, the zero clearing exceeds the upper limit of the transaction size, an overflow happens, and an abort occurs.

The execution of an asynchronous garbage collection (GC) check is started by putting each application to sleep that periodically checks the flag set by stop-the-world GC. However, because a system call is not allowed during a transaction to put applications to sleep, an abort occurs when the setting of a flag is detected during a transaction.

Class loading is the on-demand loading of classes while a program is running. When class loading occurs during a transaction, the I/O causes a transaction to abort.

Because runtime helpers cause aborts for a wide variety of reasons and the aborts continue to occur when transactions are simply retried, it is difficult to resolve these aborts using the prior art techniques.

The techniques in Patent Literature 1 and Non-patent Literature 2 use abort information provided by the HTM hardware. When an asynchronous GC check or class loading is called during a transaction, the reason for the abort from the standpoint of the hardware was a system call. As a result, the techniques in Patent Literature 1 and Non-patent Literature 2 cannot differentiate between the two and take the appropriate action, which is different in both cases.

The technique in Patent Literature 2 can avoid an abort by bounding the runtime helper causing the abort with a suspend instruction and a resume instruction. However, use of the technique in Patent Literature 2 assumes that the suspend instruction and resume instruction are supported by the hardware. Therefore, the problem remains for the hardware that does not support the suspend or resume instructions.

The technique in Patent Document 3 requires the switching of the implementation of transactional memories during runtime. However, the switching timing described in Patent Document 3 refers only to performance, current workload and resource deployment. It cannot take the appropriate action based on the type of runtime helper causing an abort.

The technique in Non-patent Literature 1 executes a non-transactional path only when aborts have occurred a predetermined number of times and then re-executes a transaction. However, depending on the type of runtime helper causing the abort, the aborts that occurred the predetermined number of times may be wasteful, and the problem may not be resolved simply by executing a non-transactional path. A specific action has to be taken depending on the type of runtime helper, and this solution is not mentioned in Non-patent Literature 1.

The technique in Non-patent Literature 3 delays the re-execution of transactions after an abort has occurred because of a conflict between the transactions. Therefore, an abort caused by the calling of a runtime helper cannot be resolved using this technique.

It is an object of the present invention to provide a solution to this technical problem by providing a technique for reducing the number of aborts caused by a runtime helper being called during the execution of a transaction block.

Technical Solution

In order to solve this technical problem, a first aspect of the present invention provides an abort reducing method for a computer to reduce the number of aborts while running a program using hardware transactional memory. This abort reducing method comprises the steps of: (a) the computer running a runtime helper in response to a call to the runtime helper during execution of a transaction block; (b) the computer running an abort handler in response to an abort caused by the call to the runtime helper; and (c) the computer running a non-transactional path corresponding to the transaction block after the abort handler in (b) has been run. The execution of the runtime helper includes the process of passing ID information indicating the type of runtime helper to the abort handler, and the execution of the abort handler including the processes of acquiring the ID information of the runtime helper causing the abort and disabling the transaction block with respect to a specific type of runtime helper. As mentioned above, a runtime helper is a function of a virtual machine called by an interpreter or JIT-compiled executable code during runtime but is not included in the interpreter or JIT-compiled executable code. A transaction block is a program area bounded by a transaction start instruction and a transaction end instruction, and is a program area executed as a transaction while a program using hardware transactional memory is running.

Preferably, the process of disabling the transaction block with respect to the specific type of runtime helper further comprises the processes of: disabling the transaction block unconditionally with respect to a first type of runtime helper unexecutable even on a non-transactional path; and disabling the transaction block with respect to a second type of runtime helper executable on a non-transactional path on condition that the second type of runtime helper is not called even once during execution of the non-transactional path.

Here, the first type of runtime helper includes runtime code patching, and the second type of runtime helper includes runtime compilation and class loading.

Preferably, the abort reducing method further comprises the step of (d) the computer re-enabling the transaction block in response to a program reaching a steady state when the transaction block was conditionally disabled.

Instead of a configuration in which the transaction block is re-enabled, the following configuration may be used. Here, the running of the runtime helper includes, when the runtime helper is the second type of runtime helper, the processes of: recording the processing content using a non-transaction write instruction, and running a transaction abort instruction with the ID information as the argument; and the running of the abort handler includes, when the transaction block has been disabled with respect to the second type of runtime helper, registering the recorded processing content in a table. The abort reducing method further comprises the step of (e) the computer re-enabling the transaction block in response to the processing content registered in the table having been run.

Here, the processing content is identification information for a method to be compiled when the second type of runtime helper is runtime compilation, and the processing content is an identifier of a class to be loaded when the second type of runtime helper is class loading.

Preferably, the abort handler determines that thread-local heap allocation and asynchronous garbage collection checks are not among the specific types of runtime helper.

Also, the abort reducing method preferably comprises the steps of: (f) the computer disabling all of the transaction blocks at the start of program execution; and (g) the computer enabling all of the transaction blocks in response to a predetermined period of time having elapsed after the start of program execution.

Preferably, the running of the runtime helper includes the process of issuing a transaction abort instruction; and passing the ID information to the abort handler includes the process of using the ID information as the argument of the transaction abort instruction. Alternatively, passing the ID information to the abort handler includes the process of recording the ID information using a non-transactional write instruction, and the runtime helper performs the essential runtime helper processing after this process.

Preferably, the running of the runtime helper includes the process of recording the information required for execution using a non-transactional write instruction on condition that the runtime helper is a type of runtime helper other than the specific types. Also, the running of the abort handler includes the process of running the other type of runtime helper using the recorded required information. The abort reducing method further comprises the step of (h) the computer rerunning the transaction block after these processes instead of (c).

Instead of a configuration in which execution of the runtime helper is delayed, the following configuration may be used. Here, the running of the runtime helper includes the process of recording the information required for execution using a non-transactional write instruction on condition that the runtime helper is a type of runtime helper other than the specific types, and the process of canceling the execution. The abort reducing method further comprises the step of (i) the computer running the other type of runtime helper using the recorded required information after the transaction block has been run.

Here, the specific types of runtime helper include class loading, the other type of runtime helper is runtime compilation, and the required information is identification information for the method to be compiled. Also, the specific types of runtime helper include class loading, the other type of runtime helper is runtime code patching, and the required information is the address and data for runtime code patching.

Preferably, the running of the runtime helper when the runtime helper is runtime compilation includes the process of replacing a runtime code patching call in a transaction block included in the code to be compiled with a transaction abort instruction, and creating a correspondence table for the information required for the runtime code patching from an address in the transaction abort instruction. The abort reducing method further comprises the step of (j) the computer rerunning the transaction block after running the abort handler in response to the execution of the replaced transaction abort instruction. Here, the running of the abort handler includes the process of performing a runtime code patch by consulting the correspondence table and acquiring the required information from the address of the transaction abort instruction, and overwriting the transaction abort instruction with an nop instruction.

Instead of having the compiler replace the runtime code patch, the following configuration may be used. Running the abort handler includes, on condition that the runtime helper is runtime code patching, write-protecting the page including the instruction address in which the abort occurred, disabling the write protection on condition that the cause of the abort is a write-protection exception, acquiring the address and data for the runtime code patch by identifying the write instruction at the write-protected location, and performing the runtime code patch. The abort reducing method further comprises the step of (k) the computer rerunning the transaction block instead of (c) after the write protection or runtime code patch performed by the abort handler.

The present invention was explained as an abort reducing method, but the present invention can also be grasped as an abort reducing program for running in a computer each step of the abort reducing method explained above, or as an abort reducing device having suitable means for running in a computer each step of the abort reducing method.

Advantageous Effects

In the present invention, ID information indicating the type of runtime helper is passed on to the abort handler while the runtime helper is running. This enables the abort handler from the start to perform processing based on the type of runtime helper, and to disable transaction blocks with respect to specific types of runtime helper. As a result, the number of aborts caused by a runtime helper being called during execution of a transaction block can be effectively and efficiently reduced. Other effects of the present invention can be understood from the description of the embodiments.

BRIEF DESCRIPTION OF DRAWINGS

FIG. 5 (b) is a flowchart showing an example of the latter half of the processing flow for an abort handler.

FIG. 7 (b) is a flowchart showing another example of an enabling process for a transaction block.

FIG. 17 (b) is a graph showing the results of a test in which the throughput per number of threads in the prior art and in the present invention were compared.

DESCRIPTION OF EMBODIMENT

The following is an explanation of embodiments of the present invention with reference to the drawings. However, these embodiments do not limit the present invention as recited in the scope of the claims. Also, all combinations of characteristics explained in the embodiment are not necessarily required in the technical solution of the present invention. In the entire explanation of the embodiments, identical elements are denoted by the same numbers.

Figure 1:
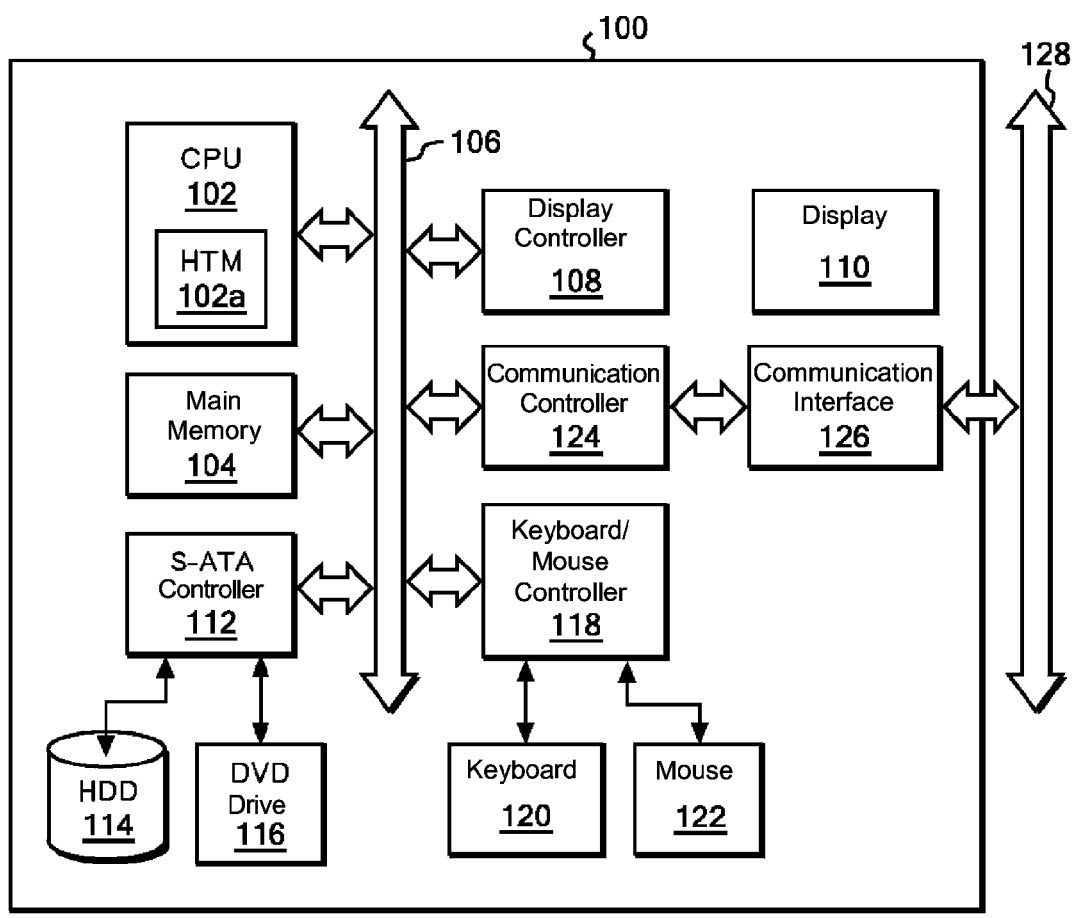
FIG. 1 is a diagram showing a preferred example of a hardware configuration for a computer system 100 used to realize an abort reducing device in an embodiment of the present invention.

FIG. 1 is a diagram showing a preferred example of a hardware configuration for a computer system 100 used to realize an abort reducing device in an embodiment of the present invention. The computer system 100 includes a main CPU (central processing unit) 102 and a main memory 104 connected to a bus 106. The CPU 102 is a multiprocessor able to perform parallel processing, and includes HTM 102a. The HTM 102a is transactional memory implemented as hardware. As mentioned earlier, each executed thread has a local copy, and the processing results are written when, at the end of processing, a shared resource value is not written by another thread. The HTM 102a can drop or redo the process when shared resource values are written and changed by another thread. Transactions using the HTM 102a are sometimes aborted. When an abort occurs, any changes to a shared resource by the transaction are cancelled or rolled back. A transaction is a series of atomic processes executed by a single thread.

A display 110 such as a liquid crystal display (LCD) may be connected to the bus 106 via a display controller 108. The display 110 may be used to control the computer and to display on an appropriate graphic interface information from a computer connected to the network via a communication line and information related to the software running on the computer.

A disk 114, such as a silicon disk or hard disk, may be connected to the bus 106 via a SATA or IDE controller 112. A drive such as a CD, DVD or BD drive, may also be connected to the bus 106 via a SATA or IDE controller 112. A keyboard 120 and mouse 122 may be optionally connected to the bus 106 via a keyboard/mouse controller 118 or USB bus (not shown), but this is not necessary to the embodiment of the present invention.

An operating system, and a program providing a Java (registered trademark) virtual machine (VM), as well as other programs and data, may be stored on the disk 114 and loaded in the main memory 104.

An abort reducing program in an embodiment of the present invention can be implemented by modifying a portion of the program providing a virtual machine so that the interpreter, compiled code executing unit, the abort handler, and the runtime helpers are able to provide the functions described below.

The computer program can be compressed or divided and stored on a plurality of media. If necessary, a drive 116 may be used to install the program on the disk 114 from a CD-ROM, DVD-ROM or BD.

The communication interface 126 can use, for example, an Ethernet (registered trademark) protocol. The communication interface 126 is connected to a bus 106 via a communication controller 124, and functions to physically connect the computer system 100 to the communication network 128. This provides a network interface layer for the TCP/IP communication protocol in the communication function of the operating system of the computer system 100. The communication line can operate on the basis of a wired LAN environment, wireless LAN environment, or Wi-Fi standard such as IEEE 802.11a/b/g/n.

The computer system 100 used in the embodiments of the present invention can be any device able to store and execute the abort reducing program in the embodiments of the present invention. The abort reducing device can be realized using a PC, server or workstation. The configurational elements explained above are for illustrative purposes only, and all of the configurational elements are not necessarily configurational elements required to embody the present invention.

Figure 2:
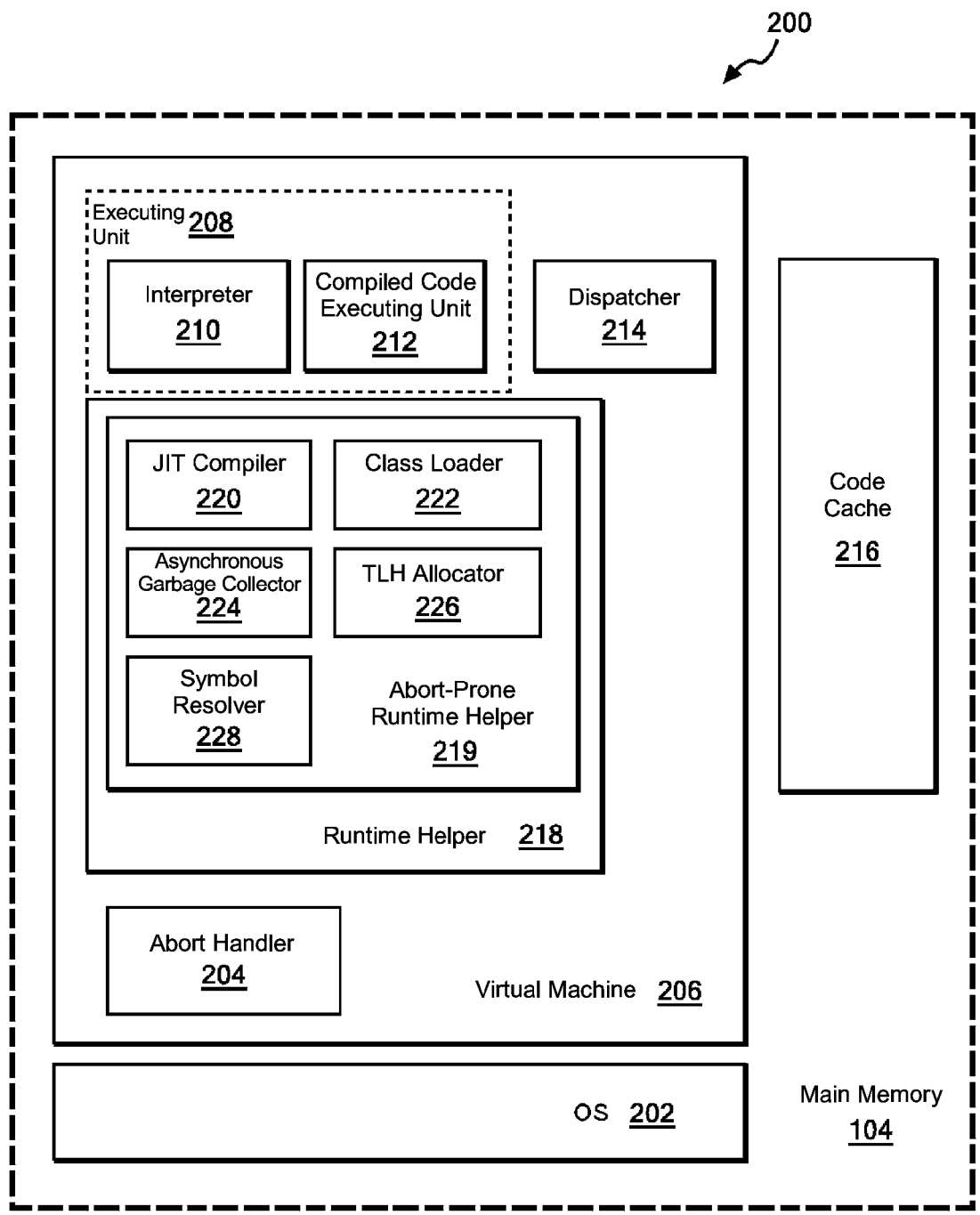
FIG. 2 is a diagram showing an example of a software configuration for the computer system 100 in FIG. 1.

FIG. 2 is a diagram showing an example of a software configuration for the computer system 100 in FIG. 1. The CPU 102 loads the virtual machine 206 and the operating system 202 in the main memory 104 by reading the virtual machine, such as a Java (registered trademark) virtual machine (VM) and the operating system from the disk 114, and reading them to the main memory 104. The operating system 202 is software which provides the basic function of the computer system 100 such as those used to manage the CPU 102 and the memory.

The virtual machine 206 is an emulator for interpreting byte code and executing compiled code. It manages the execution of code and provides services to the applications executed on the virtual machine. The virtual machine 206 has an interpreter 210, a compiled code executing unit 212, a dispatcher 214, a runtime helper group 218 including more than one runtime helper, and an abort handler 204.

The dispatcher 214 references a code cache 216, which is a memory area for storing compiled code generated by the JIT compiler 220 included in the runtime helper group 218, and determines whether the compiled code started from the byte code address to be executed next is stored in the code cache 216. When the compiled code is not in the cache, the interpreter 210 interprets the byte code to be processed. When the compiled code is in the cache, the compiled code executing unit 212 acquires the compiled code from the code cache 216 and executes it.

As mentioned above, the CPU 102 in the present invention is a multiprocessor able to perform parallel processing, and includes HTM 102a. Therefore, when there is a transaction block in the code to be executed which is bounded by a transaction start instruction and a transaction end instruction, the interpreter 210 uses the HTM 102a to execute this area as a transaction. When a transaction block is included in JIT-compiled code, the compiled code executing unit 212 uses the HTM 102a to execute this area as a transaction.

When a transaction fails, the interpreter 210 and the compiled code executing unit 212 execute a non-transactional path in accordance with predetermined conditions. Here, a non-transactional path semantically entails the same processing as a transactional block and is usually executed to move forward in the program when execution of a transaction block is aborted for whatever reason. There is a non-transactional path for each transaction block. Both are semantically the same, but execution of a non-transactional path takes longer. A transactional block may be written into a program by the programmer or may be automatically generated by a compiler from code for the transaction block. When a transaction block is automatically created by a system such as a virtual machine, the system usually generates a non-transactional path at the same time. When there is a transaction block in a program or the virtual machine 206 in the present embodiment automatically generates a transaction, it simultaneously generates the corresponding non-transactional path. In the following explanation, the interpreter 210 and the compiled code executing unit 212 are collectively referred to as the executing unit 208 (corresponding to the executing unit in claim 19).

There is a group of runtime helpers 218. A runtime helper is a function in a virtual machine which is called by the interpreter or JIT-compiled code during the runtime. Some runtime helpers may abort a transaction when executed during the transaction. These runtime helpers are referred to herein as abort-prone runtime helpers 219. Whether or not a given runtime helper is an abort-prone runtime helper 219 depends on the implementation of HTM. This group may include the JIT compiler 220, class loader 222, asynchronous garbage collector (GC) 224, TLH allocator 226, and symbol resolver 228. It is an object of the present invention to reduce the number of aborts caused by these abort-prone runtime helpers 219. First, each type of abort-prone runtime helper on this list will be explained.

The JIT compiler 220 is called when a given method has been executed a predetermined number of times. When called during a transaction, an abort occurs because the size of the workspace used by the JIT compiler 220 exceeds the transaction size supported by the hardware. One possible solution would be to run the non-transactional path only once and await the execution of the method to be JIT-compiled. If the method to be JIT-compiled is executed while running the non-transactional path, the JIT compiler 220 is called outside of the transaction block and is executed successfully. However, if the method to be JIT-compiled is not executed while running the non-transactional path, the transaction block is disabled, and is re-enabled once the program reaches a steady state.

The class loader 222 loads classes on demand while a program is running. If class loading occurs during a transaction, the I/O aborts the transaction. One solution being considered would be to run the non-transactional path only once and await the use of the same class by the non-transactional path. If the same class is used while the non-transactional path is being run, the class loader 222 is called outside of the transaction block and is executed successfully. However, if the same class is not used while the non-transactional path is being run, the transaction block is disabled, and is re-enabled once the program reaches a steady state.

The asynchronous GC 224 is called when each application that periodically checks the flag set by stop-the-world GC is put to sleep. However, because a system call is not allowed during a transaction to put applications to sleep, an abort occurs when the setting of a flag is detected during a transaction. One solution being considered would be to run the non-transactional path. By running the non-transactional path, the current thread may reach another GC check point before the next transaction, and the asynchronous GC 224 may be called outside of a transaction.

The TLH allocator 226 is often called by a program, TLH is allocated from the heap, and this is cleared to zero. However, when TLH allocation occurs during a transaction, the zero clearing exceeds the upper limit of the transaction size, an overflow happens, and an abort occurs. One solution being considered would be to run the non-transactional path. By running the non-transactional path, the current thread may allocate a new object before the next transaction, and the TLH allocator 226 may be called outside of a transaction.

The symbol resolver 228 or code patching resolves symbols in a method on demand during runtime. The code referencing the resulting symbol is patched. However, when symbols are resolved during a transaction, an abort occurs. However, the code in the transactional path is not patched when the non-transactional path is run, so this is not a solution. Therefore, one solution being considered would be to disable the transaction block so that aborts do not needlessly occur.

Abort-prone runtime helpers 219 cause aborts for many reasons, and each requires a different solution to reduce the number of aborts. In the present embodiment, an abort-prone runtime helper 219 called during the execution of a transaction block, regardless of the type of helper, passes on ID information indicating the type of abort-prone runtime helper 219 to the abort handler 204. Preferably, instead of performing the original process, the abort-prone runtime helper 219 issues a transaction abort instruction using the ID information indicating the cause of the abort as the argument when called during the execution of a transaction block.

When called by the execution of a transaction abort instruction, the abort handler 204 acquires the ID information of the abort-prone runtime helper 219 causing the abort, and disables the transaction block when the ID information indicates a specific type of abort-prone runtime helper 219. Preferably, the abort handler 204 unconditionally disables the transaction block with respect to a first type of runtime helper not executable on the non-transactional path. Also, the abort handler 204 executes the non-transactional path once with respect to a second type of runtime helper executable on the non-transactional path, and disables the transaction block when the second type of runtime helper was not called during the execution of the non-transactional path. Here, the first type of abort-prone helper includes runtime code patching, and the second type of runtime helper includes JIT compilation and class loading. The abort handler 204 determines that TLH allocation and asynchronous GC checks are runtime helpers other than these specific types of runtime helper and does not do anything.

After the processing performed by the abort handler 204, the executing unit 208 runs the non-transactional path corresponding to the transaction block in which the abort occurred. When the transaction block has been conditionally disabled by the abort handler 204, the executing unit 208 re-enables the transaction block in response to the program reaching steady state. This is because the loading of a class that caused an abort or the compiling of a method that caused an abort is expected to have been completed in steady state. In the present specification, the mode in which a transaction block has been disabled until the cause of an abort has been resolved is referred to as a temporary non-transactional mode. The return of the program to a steady state may be determined by determining whether a sufficient number of classes has been loaded, a sufficient number of methods has been compiled, or both. This includes the following methods:

the time since a new class was compiled, the time since a new method was compiled, or both has continued for more than 10 seconds;

the number of classes that have been loaded is 1000, the number of methods that have been compiled is 1000, or both; and the number of classes loaded in one second, the number of methods compiled in one second or both have been monitored, the number is, for example, ten or less per second, or 1000 in ten seconds (the optimum value should be determined during preliminary testing).

The abort reducing methods described above are the basic techniques for reducing aborts and can be expanded from the four perspectives described below.

A. Timing for going into the temporary non-transaction mode

A1. The timing until going into temporary non-transaction mode is determined for each transaction (basic technique).

A2. The temporary non-transaction mode is deliberately entered during warm-up immediately after execution of a program is started (using Technique A1 after the program is steady state).

B. Identifying the cause of an abort

B1. The ID information of the abort-prone runtime helper 219 is used as the information indicating the cause of the abort, and is used as the argument in a transaction abort instruction (basic technique).

B2. A non-transaction write instruction is used to record the information ID of the abort-prone runtime helper 219 in the area for recording the runtime helper in the thread currently being executed.

B3. A non-transaction write instruction is used to record the information ID of the abort-prone runtime helper 219 in the area for recording the runtime helper in the thread currently being executed along with information needed by the abort-prone runtime helper 219 to perform the processing.

B4. A correspondence table is created for the information needed for code patching from the address of the transaction abort instruction.

B5. The page protection is used.

It should be noted that the non-transaction write instruction refers to a regular write instruction, and is not rolled back even when the transaction is aborted.

C. Solving the cause of an abort

C1. A non-transactional patch is executed, the transaction block is disabled, or both (basic technique).

C2. The processing performed by the abort-prone runtime helper 219 is delayed, and performed during execution of the abort helper 204.

D. Timing for leaving the temporary non-transaction mode

D1. Wait for the program to reach steady state (basic technique).

D2. Wait for the delay process in the abort handler 204 to end.

D3. Wait for classes for class loading that were not executed because of an abort to be loaded, all methods that were not compiled because of an abort to be compiled, or both.

The basic techniques are used in the first embodiment described below, and combinations of the expanded techniques described above are used in five additional embodiments, which are the second through sixth embodiments explained below.

2nd Embodiment (A1+B2+C1+D1)

Whether or not a given runtime helper causes an abort when called during the execution of a transaction depends on how the HTM was implemented. For example, JIT compilation does not cause a transaction to abort if the implementation of the hardware transactional memory supports a very large transaction size. When a transaction abort instruction is issued every time an abort-prone runtime helper 219 is called during a transaction, the implementation of the hardware transactional memory could lead to a decrease in performance.

In the second embodiment, instead of issuing a transaction abort instruction, the abort-prone runtime helper 219 records that the regular processing was executed in the memory area of the thread currently being executed using a non-transactional write instruction. The abort handler 204 determines whether or not this has been recorded, and determines the cause of the abort based on what has been recorded. Here, the information recorded in the memory area by the abort-prone runtime helper 219 may simply be the ID information of the helper.

3rd Embodiment (A1+B3+C2+D2)

In the basic techniques of the first embodiment, the transaction block is promptly disabled when the abort-prone runtime helper 219 is code patching. Even when the abort-prone runtime helper 219 is a JIT compiler 220, the transaction block is disabled even when the JIT compiler 220 is not called once during execution of a non-transactional path. Because execution of a non-transactional path in the manner described above takes longer than execution of the transaction block, the disabling of the transaction block decreases performance.

In the third embodiment, execution is delayed and then executed in the abort handler 204 when the abort-prone runtime helper 219 called during a transaction is the JIT compiler 220 or symbol resolver 228. The JIT compiler 220 or symbol resolver 228 have no side effects visible to the programmer (program execution semantics) and the execution order is not strictly defined. Therefore, there are no problems when execution is delayed. However, the class loader 222 does not allow for delays because it has side effects visible to the programmer (programmer-visible semantics).

Because execution is delayed instead of issuing a transaction abort instruction, abort-prone runtime helpers 219 such as a JIT compiler 220 or symbol resolver 228 record information needed for processing along with the ID information in the memory area of the thread currently being executed using a non-transactional write instruction. The abort handler 204 determines whether anything has been recorded, and performs JIT compilation or code patching based on what has been recorded. Here, the information recorded by the JIT compiler 220 in the memory area is identification information for the method to be compiled. Also, the information recorded by the symbol resolver 228 in the memory area is the address and data for runtime code patching. When the processing performed by the abort handler 204 has been completed, the executing unit 208 executes the transaction block.

4th Embodiment (A1+B4+C2+D2)

In the third embodiment, a non-transactional write instruction was used. However, some machines do not support non-transactional write instructions.

Here, the processing explained below is added to the regular processing performed by a JIT compiler 220 instead of using a non-transactional write instruction as in the third embodiment. The JIT compiler 220 replaces the call for a runtime code patch in a transaction block included in compiled code with a transaction abort instruction, and creates a correspondence table for the information needed to perform the runtime code patch from the address of the transaction abort instruction. The information needed to perform the runtime code patch is the address and data to be patched at runtime.

When called by the execution of the replaced transaction abort instruction, the abort handler 204 consults the correspondence table and acquires the needed information from the address of the transaction abort instruction. The abort handler 204 performs the runtime code patch on the basis of the acquired information, and overwrites the transaction abort instruction with an nop instruction. After the processing performed by the abort handler 204 has been completed, the executing unit 208 executes the transaction block again.

5th Embodiment (A1+B5+C2+D2)

Code patching is often used, not only for symbol resolution, but also on JIT-compiled code such as JIT compilation and polymorphic inline method caching. However, as described above, code patching causes an abort when called during the execution of a transaction. The execution can be delayed until the abort handler 204 begins its processing, as described in the third embodiment, but the insertion of logic to delay processing at the location of each code patch during managed runtime is not practical from the standpoint of software engineering.

Therefore, in the fifth embodiment, code patching is delayed without inserting logic to delay processing at the location of each code patch. First, the abort handler 204 prohibits the writing of pages including instruction addresses at which an abort occurred on condition that the abort-prone runtime helper 219 that caused the abort is runtime code patching. Afterwards, the executing unit 208 executes the transaction block again. When it has been called the next time, the abort handler 204 disables the previous write protect on condition that the cause of the abort is not a write-protection exception, acquires the address and data to be used in the runtime code patch by identifying the write instruction at the location where the write protect occurred, and performs the runtime code patching. The executing unit 208 then executes the transaction block one more time.

6th Embodiment(A1+B1+C1+D3)

In the first embodiment, when the calling of a JIT compiler 220 or class loader 222 during a transaction causes an abort and the transaction block is disabled, the transaction block is re-enabled after the program has returned to a steady state. However, when the program is in a steady state, there is no guarantee that a method causing an abort will be compiled by the JIT compiler or a class causing an abort will be loaded.

Therefore, in the sixth embodiment, the transaction block is re-enabled after it has been confirmed that a method causing an abort has been compiled by the JIT compiler or a class causing an abort has been loaded. In the sixth embodiment, the JIT compiler 220 or class loader 222 called during the execution of a transaction records the processing content in the memory area of the thread currently being executed using a non-transactional write instruction, and issues a transaction abort instruction using the ID information as the argument. Here, the processing content of the JIT compiler 220 is identification information for the method to be compiled, and the processing content of the class loader 220 is an identifier for the class to be loaded.

When called by a transaction abort instruction, the abort handler 204 retrieves the information recorded in the memory area of the thread currently being executed and records the information in a global table when a transaction block has been disabled with respect to the JIT compiler 220 and class loader 222. The executing unit 208 then re-enables the transaction block when the processing details recorded in the global table have been executed.

Figure 3:
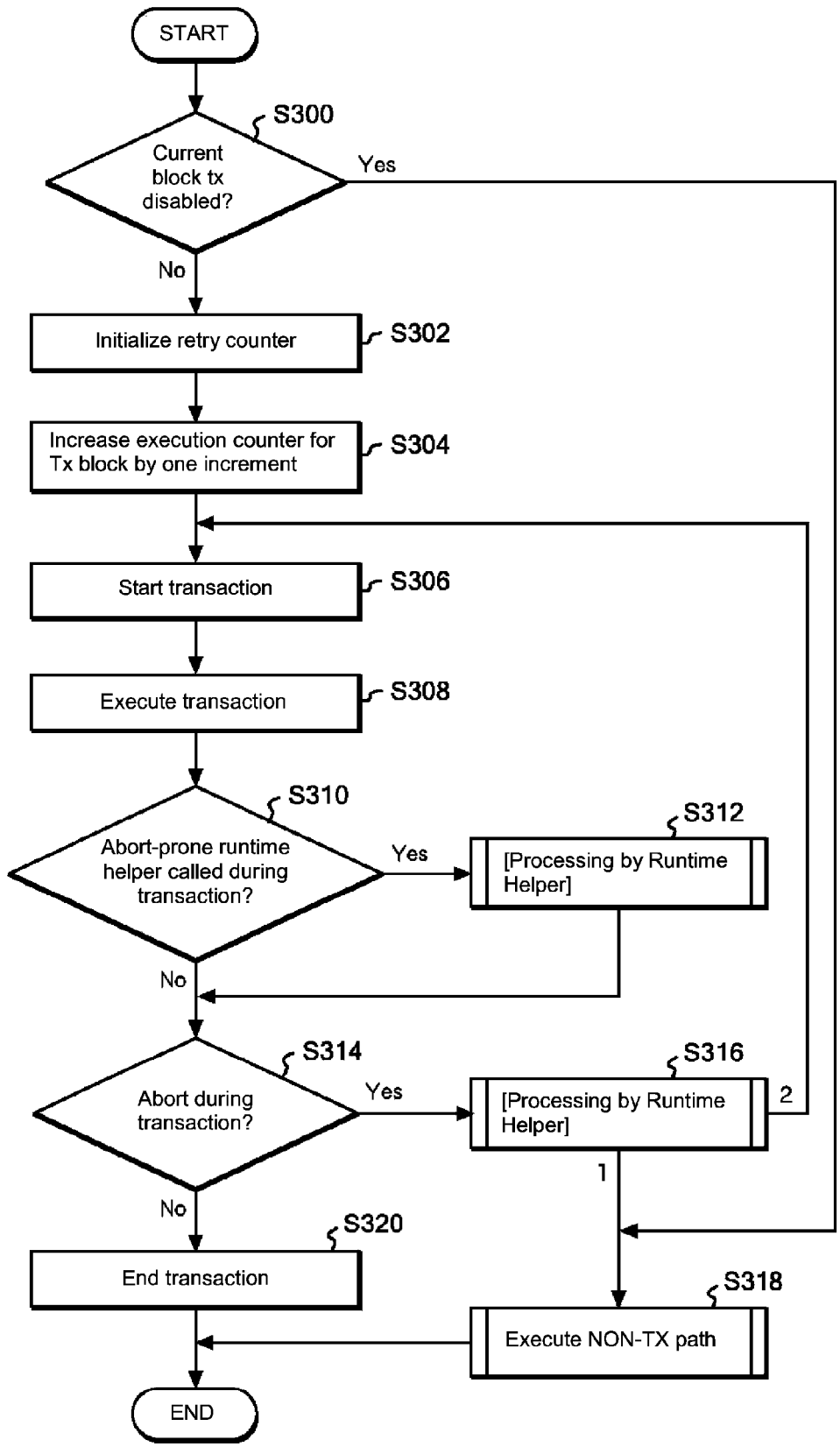
FIG. 3 is a flowchart showing an example of the entire processing flow for abort reduction in an embodiment of the present invention.
Figure 4:
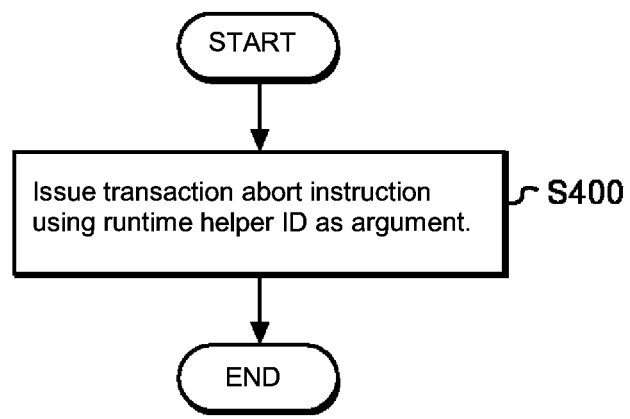
FIG. 4 is a flowchart showing an example of the processing flow for a runtime helper.
Figure 5:
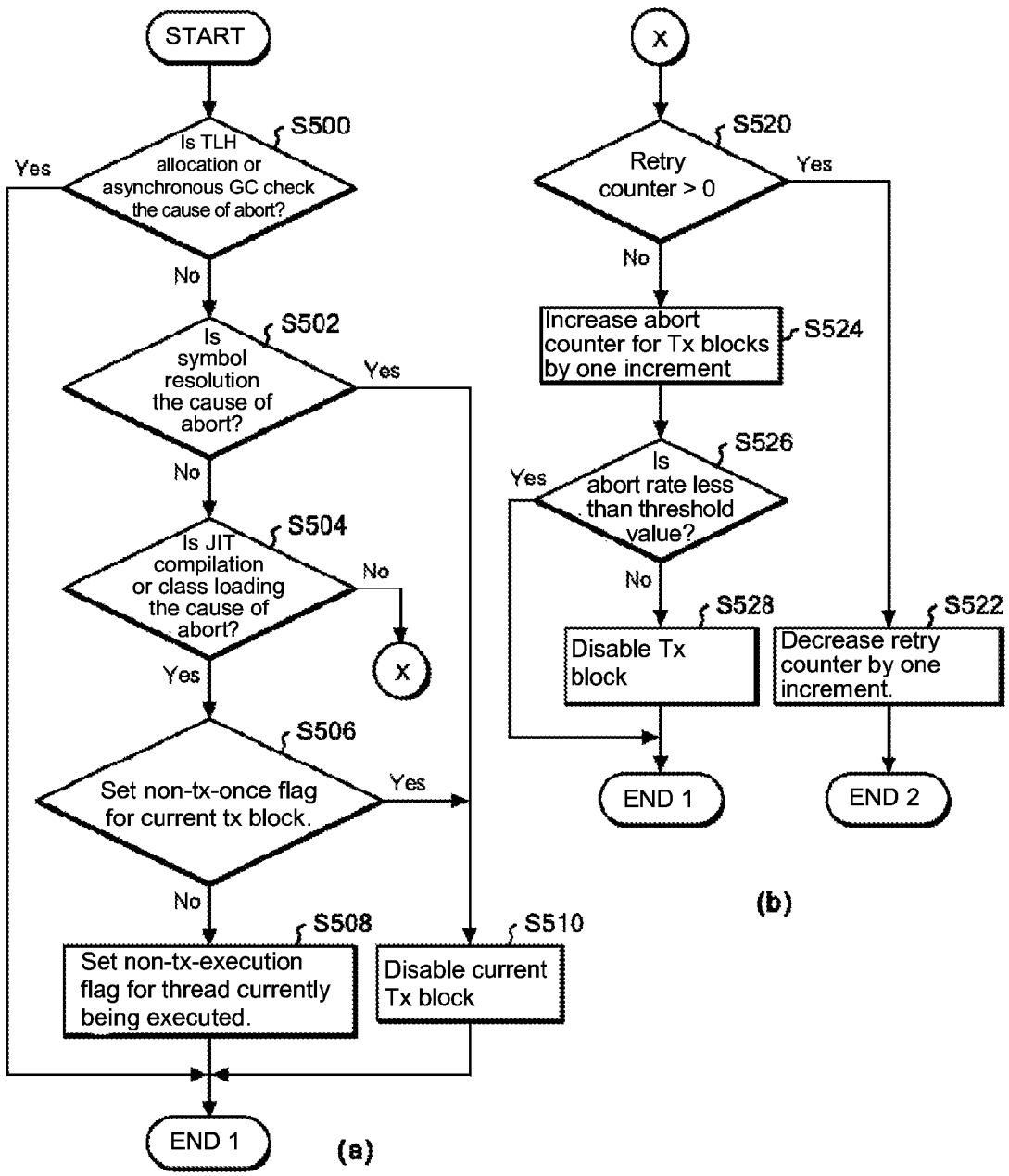
FIG. 5 (a) is a flowchart showing an example of the first half of the processing flow for an abort handler.
Figure 6:
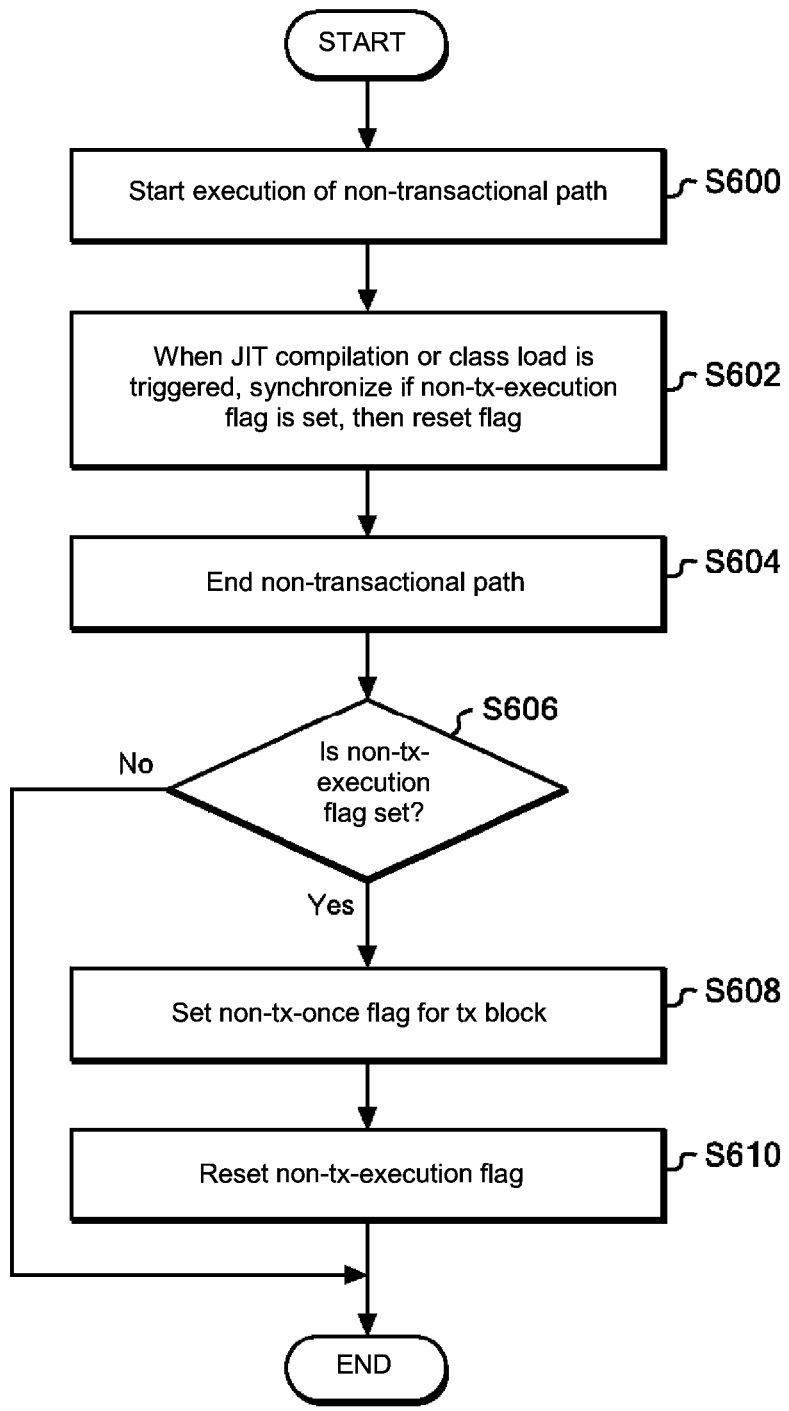
FIG. 6 is a flowchart showing an example of the execution processing flow for a non-transactional path.
Figure 7:
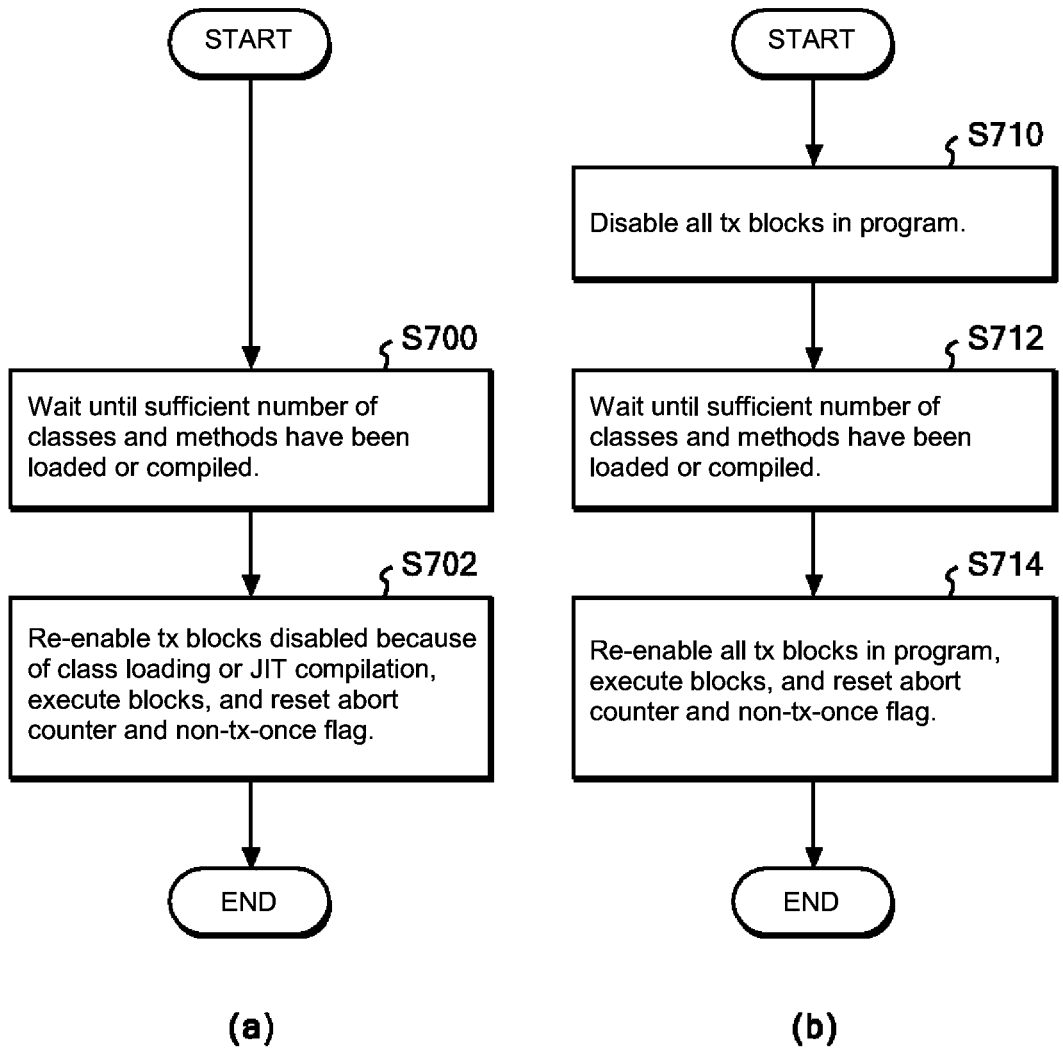
FIG. 7 (a) is a flowchart showing an example of an enabling process for a transaction block.

The following is an explanation of the flow of the abort reducing processes of the present invention with reference to FIG. 3 through FIG. 16. First, the flow of the abort reducing process in the first embodiment will be explained with reference to FIG. 3 through FIG. 7. FIG. 3 is a flowchart showing an example of the entire processing flow for abort reduction in the embodiment of the present invention. FIG. 4 is a flowchart showing an example of the processing flow for the abort-prone runtime helper 219. FIG. 5 (*a*) and FIG. 5 (*b*) are flowcharts showing an example of a portion of the processing flow for the abort handler 204. FIG. 6 is a flowchart showing an example of the execution processing flow for a non-transactional path. FIG. 7 (*a*) and FIG. 7 (*b*) are flowcharts showing an example of an enabling process for a transaction block.

The flowchart in FIG. 3 is started by the execution of a transaction block. The executing unit 208 determines whether or not the current transaction block to be executed has been disabled (Step 300). When the current transaction block has not been disabled (Step 300: NO), the executing unit 208 initializes the retry counter with a positive integer to count the number of retries performed on the current transaction block (Step 302). Also, the executing unit 208 increases by one the execution counter for counting the number of times the current transaction block has been executed (Step 304). Then, the executing unit 208 starts and executes the transaction (Step 306, Step 308). A retry counter is held for each thread, and execution counter and abort counter described below are held for each transaction block. The execution counter and the abort counter are initialized when code is loaded which includes the corresponding transaction block.

Next, the executing unit 208 determines whether an abort-prone runtime helper 219 has been called in the transaction (Step 310). When an abort-prone runtime helper 219 has been called (Step 310: YES), the process progresses to Step 312, and processing is performed by the called abort-prone runtime helper 219. Details of the processing performed by the abort-prone runtime helpers 219 is explained below with reference to FIG. 4. After processing has been performed by the abort runtime helper 219 or an abort-prone runtime helper 219 is not called (Step 310: NO), the process progresses to Step 314, and the executing unit 208 determines whether or not an abort occurred in the transaction.

When an abort has occurred in the transaction (Step 314: YES), the process progresses to Step 316, and processing is performed by the abort handler 204. Details of the processing performed by the abort helper 204 are described below with reference to FIG. 5. When no abort has occurred in a transaction (Step 314: NO), the process progresses to Step 320, the executing unit 208 ends the transaction (Step 320), and the process ends.

The processing performed by the abort handler 204 in Step 316 has two results. When the result is 2, the process returns to Step 306, and execution of the current transaction block is retried. When the result of the processing performed by the abort handler 204 is 1 or the current transaction block was determined to be disabled in Step 300 (Step 300: YES), the process advances to Step 318, and the executing unit runs the non-transactional path. Details on running the non-transactional path are described below with reference to FIG. 6. After the non-transactional path has been run, the process ends.

The flowchart in FIG. 4 shows the details of the processing performed by the abort-prone runtime helper 219 in Step 312 of the flowchart in FIG. 3. The process starts in Step 400 where the abort-prone runtime helper 219 issues a transaction abort instruction using an ID indicating the type of abort-prone runtime helper 219 as the argument indicating the cause of the abort. Afterwards, the abort-prone runtime helper 219 ends the process. The processing shown in the flowchart in FIG. 4 is executed when an abort-prone runtime helper 219 is called during a transaction. The abort-prone runtime helper 219 performs its regular process when a transaction is not being executed.

The flowchart in FIG. 5 (*a*) shows the first half of the processing performed by the abort handler 204 in Step 316 of the flowchart shown in FIG. 3. The process starts in Step 500, where the abort handler 204 determines whether the cause of an abort was a TLH allocation or asynchronous GC check. When the cause of the abort was a TLH allocation or asynchronous GC check (Step 500: YES), the abort handler 204 returns a result indicating 1, and ends the process. When the cause of the abort was not a TLH allocation or asynchronous GC check (Step 500: NO), the abort handler 204 determines whether the cause of the abort was symbol resolution (Step 502). When the cause of the abort was symbol resolution (Step 502: YES), the abort handler 204 promptly disables the current transaction block (Step 510), and ends the process returning the result indicating 1.

When the cause of the abort is not symbol resolution (Step 502: NO), the abort handler 204 determines whether the cause of the abort was JIT compilation or class loading (Step 504). When the cause of the abort is not JIT compilation or class loading (Step 504: NO), the process continues in Step 520 of the flowchart shown in FIG. 5 (*b*). When the cause of the abort is JIT compilation or class loading (Step 504: YES), the abort handler 204 determines whether or not the non-tx-once flag has been set for the current transaction block (Step 506).

The non-tx-once flag is a flag assigned to each transaction block. The flag is used with the non-tx-execution flag assigned to each thread as explained below. In the present embodiment, these flags are used as part of the control process in which a non-transactional path is executed once, and the current transaction block is disabled on condition that the JIT compilation or class loading that caused the abort is not executed in the meantime. The non-tx-once flag is set by the execution of the non-transaction path as described below with reference to FIG. 6. When this flag is set, it indicates that JIT compilation or class loading did not occur during the running of the non-transactional path.

Returning to Step 506 in the flowchart shown in FIG. 5 (*a*), when a non-tx-once flag has not been set (Step 506: NO), the abort handler 204 sets the non-tx-execution flag for the thread currently being executed (Step 508). The non-tx-execution flag indicates the cause of the abort is JIT compilation or class loading. When the non-tx-once flag has been set (Step 506: YES), the abort handler 204 disables the current transaction block (Step 510). As explained above, the non-tx-once flag is set to indicate that JIT compilation or class loading has not occurred during the execution of a non-transactional path executed only once. After Step 508 or Step 510, the abort handler 204 ends the process returning the result indicating 1.

The flowchart shown in FIG. 5 (*b*) shows the flow in the latter half of the processing executed when NO has been determined in Step 504 of the flowchart shown in FIG. 5 (*a*). The processing starts in Step 520, where the abort handler 204 determines whether the value of the retry counter is greater than 0. When the value of the retry counter is greater than 0 (Step 520: YES), the abort handler 204 reduces the value of the retry counter by one (Step 522), and ends the process returning the result indicating 2.

When the value of the retry counter is 0 or less (Step 522: NO), the abort handler 204 increases the abort counter of the current transaction block by one (Step 524). The abort handler 204 then determines whether or not the abort rate determined by dividing the value of the abort counter by the value of the execution counter is less than a predetermined threshold value (Step 526). When the abort rate is less than the predetermined threshold value (Step 526: YES), the abort handler 204 ends the process returning the result indicating 1. When the abort rate is greater than the predetermined threshold value (Step 526: NO), the abort handler 204 disables the current transaction block (Step 528), and ends the process returning the result indicating 1.

The flowchart in FIG. 6 shows the details of the processing performed when the non-transactional path is run in Step 318 of the flowchart shown in FIG. 3. The process starts in Step 600, where the executing unit 208 starts running the non-transactional path. Next, when JIT compilation or class loading is triggered during execution of the non-transactional path, the JIT compilation or class loading is synchronized and executed along with the execution of the non-transactional path on condition that a non-tx-execution flag has been set for the thread currently being executed, and the non-tx-execution flag is reset for the thread afterwards (Step 602). Next, the executing unit 208 stops the execution of the non-transactional path (Step 604).

Next, the executing unit 208 determines whether the non-tx-execution flag has been set for the thread currently being executed (Step 606). When the non-tx-execution flag has not been set for the thread currently being executed (Step 606: NO), the executing unit 208 ends the process. When the non-tx-execution flag has been set for the thread currently being executed (Step 606: YES), the executing unit 208 sets the non-tx-once flag assigned to the current transaction block (Step 608), and then resets the non-tx-execution flag for the thread (Step 610). Afterwards, the executing unit 208 ends the process.

The flowchart in FIG. 7 (*a*) shows processing periodically executed by the executing unit 208. The process starts in Step 700, where the executing unit 208 waits until a sufficient number of classes has been loaded or a sufficient number of methods has been compiled. Next, the executing unit 208 re-enables all of the transaction blocks disabled because of JIT compilation or class loading, and resets all of the corresponding execution counters, abort counters and non-tx-once flags (Step 702). The executing unit 208 then ends the process.

FIG. 7 (*b*) is a flowchart showing the flow of a process newly executed by the executing unit 208 at the start of the program when the A2 configuration has been added to the A1 configuration in the first embodiment. The process starts in Step 710, where the executing unit 208 disables all transaction blocks including program code to be executed. Next, the executing unit 208 waits until a sufficient number of classes has been loaded or a sufficient number of methods has been compiled (Step 712). Next, the executing unit 208 re-enables all of the transaction blocks in the program code to be executed, and resets all of the corresponding execution counters, abort counters and non-tx-once flags (Step 714). The executing unit 208 then ends the process.

Figure 8:
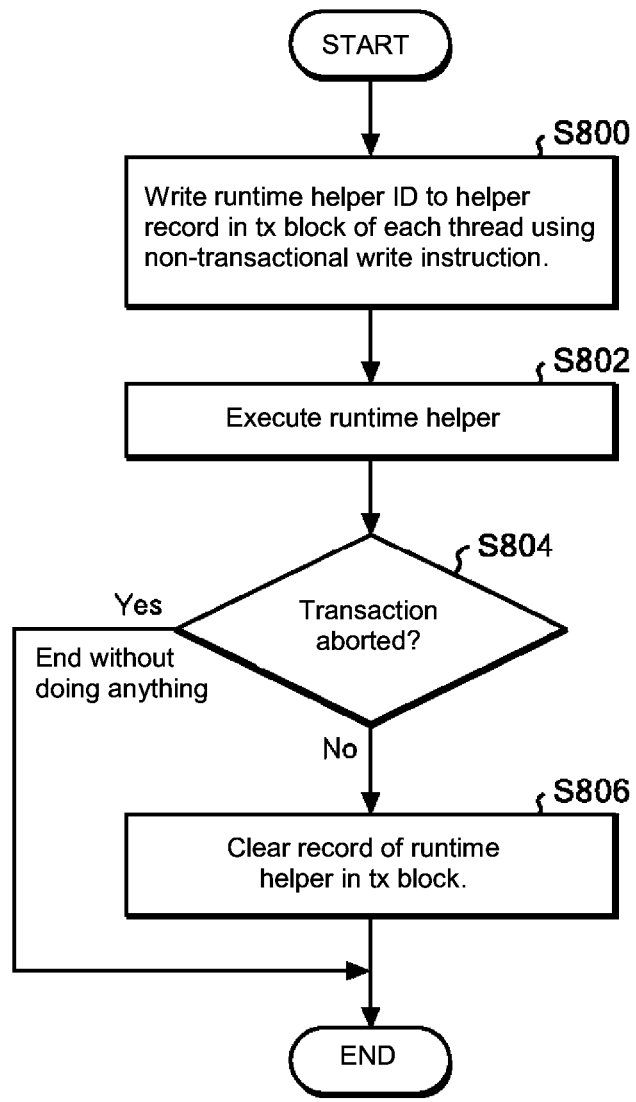
FIG. 8 is a flowchart showing another example of the processing flow for a runtime helper.

The following is an explanation of the flow of the abort reducing process in the second embodiment with reference to FIG. 5 through FIG. 8. Further explanation of the steps in the flowcharts other than FIG. 8 has been omitted, because these steps have already been explained with reference to the first embodiment. FIG. 8 is a flowchart showing another example of the flow of the processing performed by the abort-prone runtime helper 219 in Step 312 of the flowchart shown in FIG. 3.

The flowchart in FIG. 8 starts with Step 800, where the abort-prone runtime helper 219 uses a non-transactional write instruction to record an ID indicating the type of runtime helper in the memory area of the thread currently being executed. Next, the abort-prone runtime helper 219 executes its regular processing (Step 802). Next, the abort-prone runtime helper 219 determines whether or not the transaction currently being executed has been aborted.

If the transaction currently being executed has been aborted (Step 804: YES), the abort-prone runtime helper 219 ends the process without doing anything further. When the transaction currently being executed has not been aborted (Step 804: NO), the abort-prone runtime helper 219 clears the information recorded in the memory area of the thread currently being executed (Step 806), and ends the process. In the second embodiment, the abort handler 204 first reads the information recorded in the memory area of the thread currently being executed in the process shown in the flowchart of FIG. 5.

Figure 9:
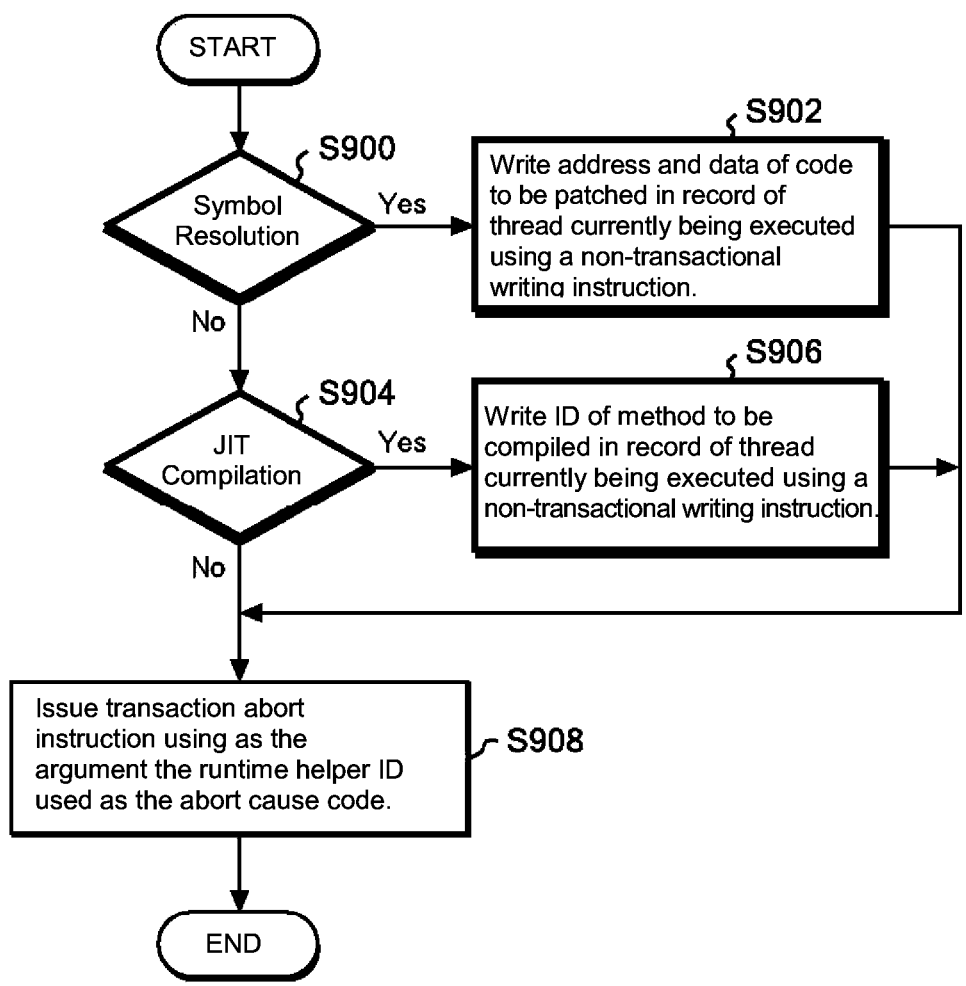
FIG. 9 is a flowchart showing another example of the processing flow for a runtime helper.
Figure 10:
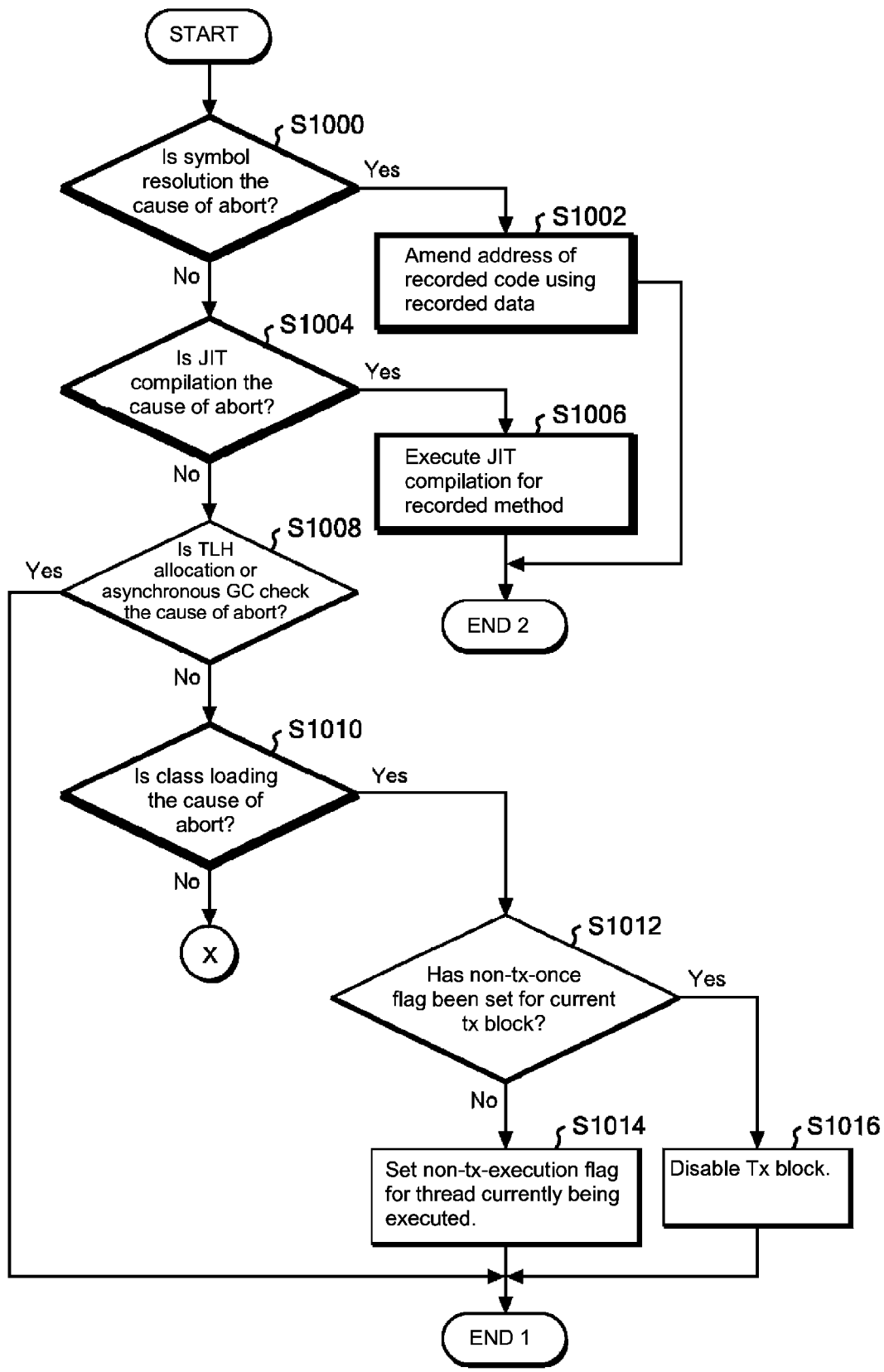
FIG. 10 is a flowchart showing another example of a portion of the processing flow for an abort handler.

The following is an explanation of the flow of the abort reducing process in the third embodiment with reference to FIG. 3, FIG. 5 (*b*), FIG. 6, FIG. 7, FIG. 9, and FIG. 10. Further explanation of the steps in the flowcharts other than FIG. 9 and FIG. 10 has been omitted, because these steps have already been explained with reference to the first embodiment. Because the JIT compilation is not the cause of transaction blocks being disabled in the third embodiment, the description of JIT compilation in Steps 700, 702, 712 and 714 has to be omitted from the flowcharts in FIG. 7 (*a*) and FIG. 7 (*b*). FIG. 9 is a flowchart showing another example of the processing flow for the abort-prone runtime helper 219 in Step 312 of the flowchart in FIG. 3. FIG. 10 is a flowchart showing another example of a portion of the processing flow for the abort handler 204 in Step 316 of the flowchart in FIG. 3.

The flowchart shown in FIG. 9 starts in Step 900, where the abort-prone runtime helper 219 determines whether the processing details are for symbol resolution. When the processing details are for symbol resolution (Step 900: YES), the abort-prone runtime helper 219 uses a non-transaction write instruction to write the address and data of the code to be patched in the memory area of the thread currently being executed (Step 902).

When the processing details are not for symbol resolution (Step 900: NO), the abort-prone runtime helper 219 determines whether the processing details are for JIT compilation (Step 904). When the processing details are for JIT compilation (Step 904: YES), the abort-prone runtime helper 219 uses a non-transaction write instruction to write the ID of the method to be JIT-compiled in the memory area of the thread currently being executed (Step 902). When processing details are not for JIT compilation (Step 904: NO), the process after Step 902 or Step 906 proceeds to Step 908, and the abort-prone runtime helper 219 issues a transaction abort instruction using the ID indicating the type of abort-prone runtime helper 219 as the argument indicating the cause of the abort. Afterwards, the abort-prone runtime helper 219 ends the process.

The flowchart in FIG. 10 starts with Step 1000, where the abort handler 204 determines whether the cause of the abort is symbol resolution. When the cause of the abort is symbol resolution (Step 1000: YES), the abort handler 204 uses the data recorded in the memory area of the thread currently being executed to modify the recorded code address (Step 1002), and ends the process returning the result indicating 2.

When the cause of the abort is not symbol resolution (Step 1000: NO), the abort handler 204 determines whether the cause of the abort is JIT compilation (Step 1004). When the cause of the abort is JIT compilation (Step 1004: YES), the abort handler 204 performs JIT compilation on the method identified by the ID recorded in the memory area of the thread currently being executed (Step 100), and ends the process returning the result indicating 2.

When the cause of the abort is not JIT compilation (Step 1004: NO), the abort handler 204 determines whether the cause of the abort is either TLH allocation or an asynchronous GC check (Step 1008). When the cause of the abort is either TLH allocation or an asynchronous GC check (Step 1008: YES), the abort handler 204 ends the process returning the result indicating 1.

When the cause of the abort is neither TLH allocation nor an asynchronous GC check (Step 1008: NO), the abort handler 204 determines whether the cause of the abort is class loading (Step 1010). When the cause of the abort is not class loading (Step 1010: NO), the process continues at Step 520 in the flowchart shown in FIG. 5 (b). When the cause of the abort is class loading (Step 1010: YES), the abort handler 204 determines whether or not the non-tx-once flag has been set for the current transaction block (Step 1012).

When the non-tx-once flag has not been set for the current transaction block (Step 1012: NO), the abort handler 204 sets the non-tx-execution flag for the thread currently being executed (Step 1014). When the non-tx-once flag has been set for the current transaction block (Step 1012: YES), the abort handler 204 disables the current transaction block (Step 1016). After Step 1014 or Step 1016, the abort handler 204 ends the process returning the result indicating 1.

Figure 11:
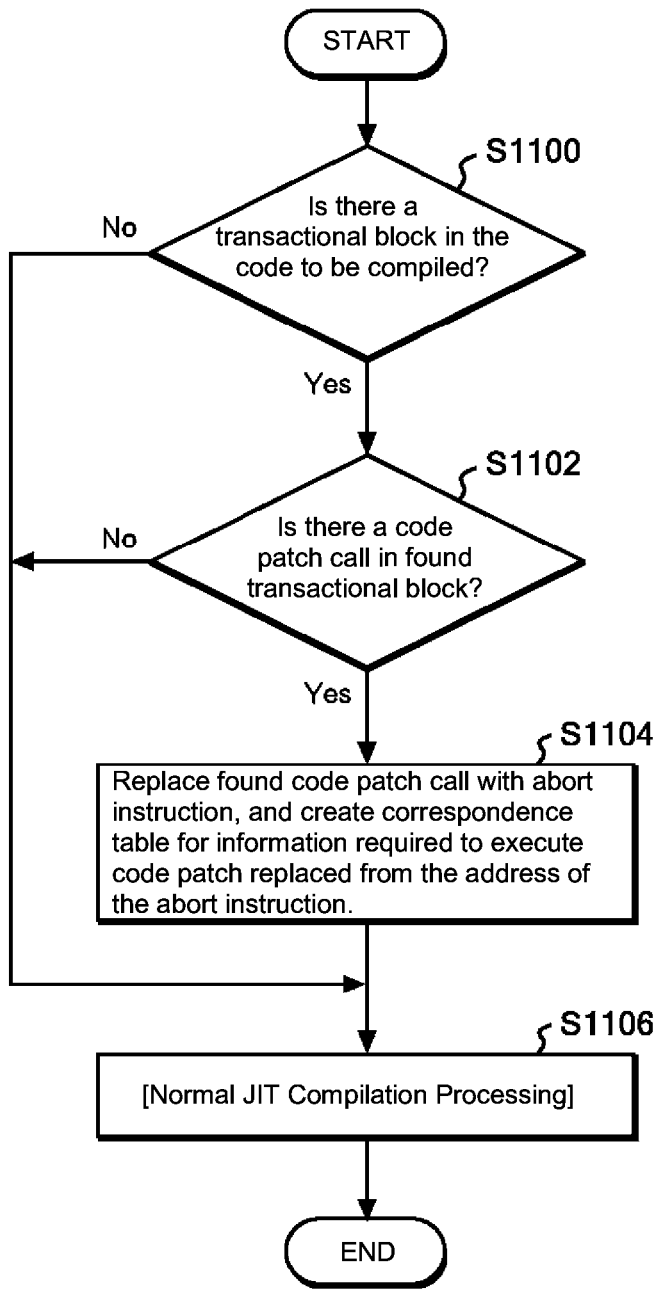
FIG. 11 is a flowchart showing an example of the processing flow for a JIT compiler.
Figure 12:
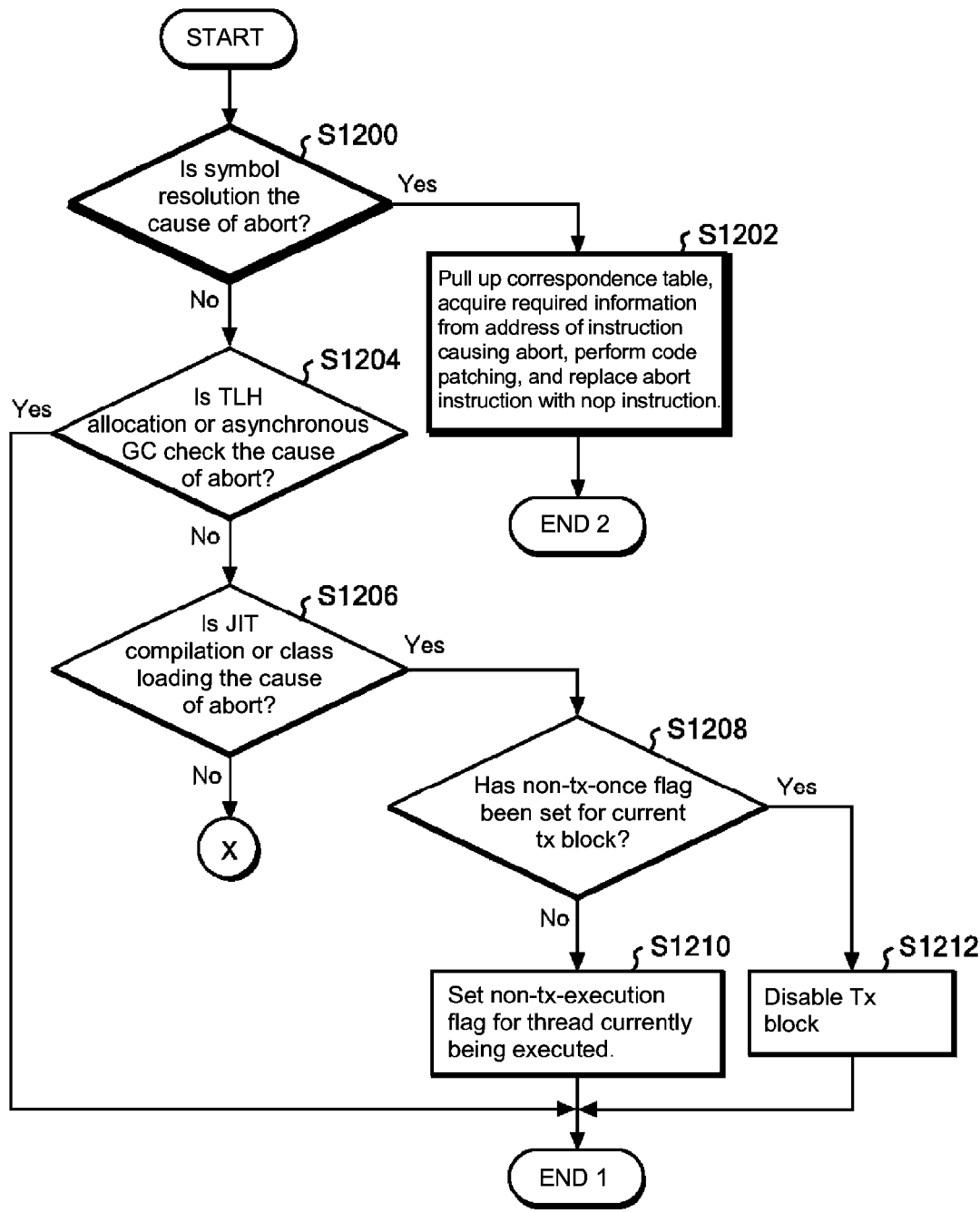
FIG. 12 is a flowchart showing another example of a portion of the processing flow for an abort handler.

The following is an explanation of the abort reducing process in the fourth embodiment with reference to FIG. 3, FIG. 4, FIG. 5 (b), FIG. 6, FIG. 7, FIG. 11 and FIG. 12. Further explanation of the steps in the flowcharts other than FIG. 11 and FIG. 12 has been omitted, because these steps have already been explained with reference to the first embodiment. FIG. 11 is a flowchart showing an example of the processing flow for the JIT compiler 220. FIG. 12 is a flowchart showing another example of a portion of the processing flow for the abort handler 204 in Step 316 of the flowchart in FIG. 3.

The flowchart in FIG. 11 starts when a given method has been executed a predetermined number of times, and the JIT compiler 220 has been called. The JIT compiler 220 determines whether or not there is a transaction block in the code to be compiled (Step 1100). When there is a transaction block in the code to be compiled (Step 1100: YES), the JIT compiler 220 determines whether or not a code patch has been called in the found transaction block (Step 1102).

When a code patch has been called in the found transaction block (Step 1102: YES), the JIT compiler 220 replaces the found call for a code patch with a transaction abort instruction, and creates a correspondence table for the information needed to execute the code patch replaced by the address of the abort instruction (Step 1104). Here, the information needed to execute a code patch is an address and data to be patched during the runtime.

When there is no transaction block in the code to be compiled in Step 1100 (Step 1100: NO) or a code patch has not been called in the found transaction block on Step 1102 (Step 1102: NO), the process proceeds from Step 1104 to Step 1106, where the JIT compiler 220 performs JIT compiling and then ends the process.

The flowchart shown in FIG. 12 starts at Step 1200, where the abort handler 204 determines whether or not the cause of the abort is symbol resolution. This can be determined by searching the correspondence table created by the JIT compiler 220 at the instruction address where the abort occurred, and determining whether or not there is a match. When there is a match, the cause of the abort is symbol resolution. When the cause of the abort is symbol resolution (Step 1200: YES), the abort handler 204 consults the correspondence table created by the JIT compiler 220, acquires the required information from the instruction address where the abort occurred, uses the acquired information to execute a code patch, and replaces the abort instruction with a nop instruction, which means nothing more is to be done (Step 1202). Afterwards, the abort handler 204 ends the process returning the result indicating 2.

When the cause of the abort is not symbol resolution (Step 1200: NO), the abort handler 204 determines whether the cause of the abort is either TLH allocation or an asynchronous GC check (Step 1204). When the cause of the abort is either TLH allocation or an asynchronous GC check (Step 1204: YES), the abort handler 204 ends the process returning the result indicating 1.

When the cause of the abort is neither TLH allocation nor an asynchronous GC check (Step 1204: NO), the abort handler 204 determines whether the cause of the abort is either JIT compilation or class loading (Step 1206). When the cause of the abort is neither JIT compilation nor class loading (Step 1206: NO), the process continues at Step 520 in the flowchart shown in FIG. 5 (b). When the cause of the abort is either JIT compilation or class loading (Step 1206: YES), the abort handler 204 determines whether the non-tx-once flag has been set for the current transaction block (Step 1208).

When the non-tx-once flag has not been set (Step 1208: NO), the abort handler 204 sets the non-tx-execution flag for the thread currently being executed (Step 1210). When the non-tx-once flag has been set (Step 1208: YES), the abort handler 204 disables the current transaction block (Step 1212). After Step 1210 or Step 1212, the abort handler 204 ends the process returning the result indicating 1.

Figure 13:
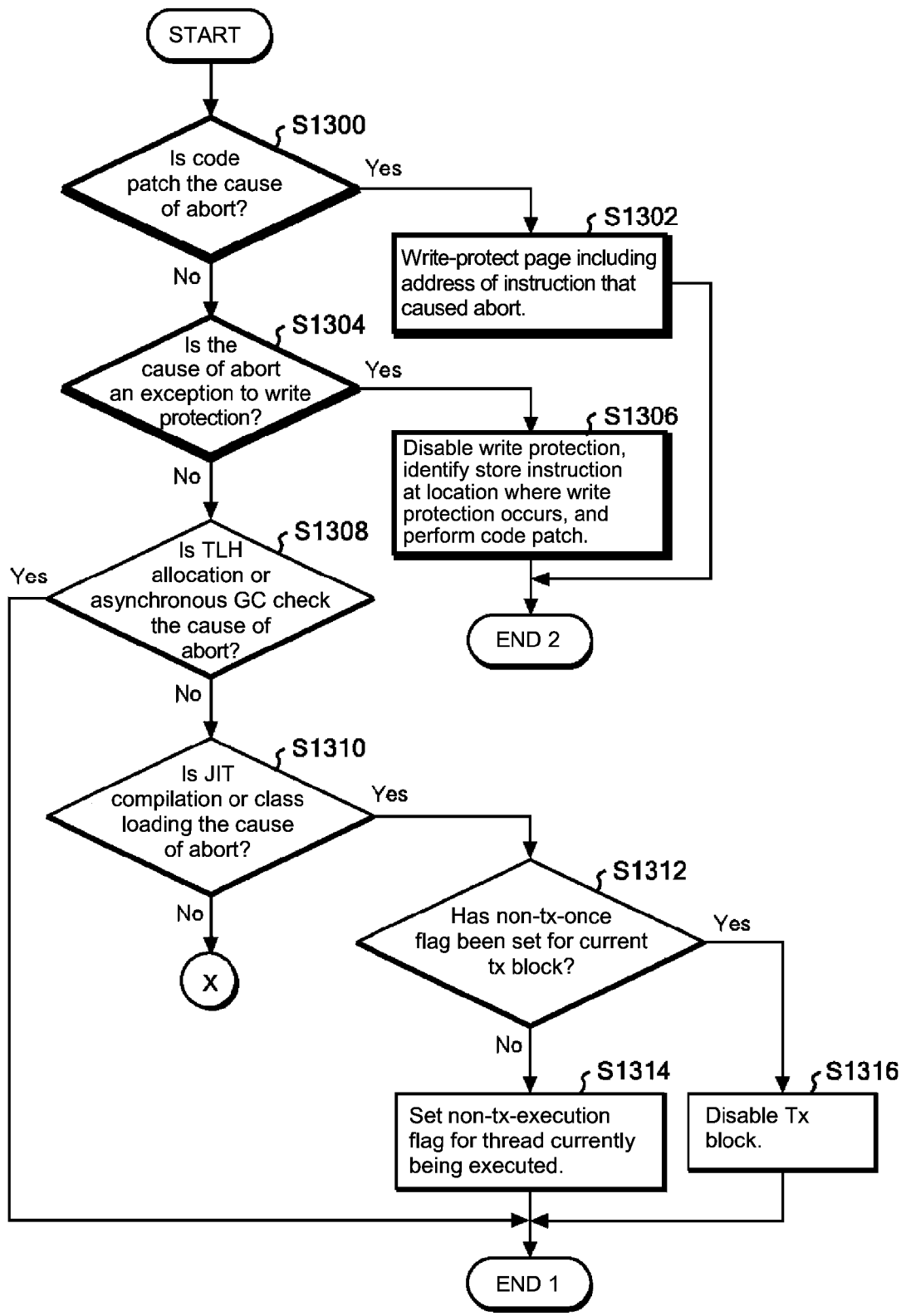
FIG. 13 is a flowchart showing another example of a portion of the processing flow for an abort handler.

The following is an explanation of the abort reducing process in the fifth embodiment with reference to FIG. 3, FIG. 4, FIG. 5 (*b*), FIG. 6, FIG. 7, and FIG. 13. Further explanation of the steps in the flowcharts other than FIG. 13 has been omitted, because these steps have already been explained with reference to the first embodiment. FIG. 13 is a flowchart showing another example of the first half of the processing flow for an abort handler 204 in Step 316 of the flowchart in FIG. 3.

The flowchart in FIG. 13 starts at Step 1300, where the abort handler 204 determines whether or not the cause of the abort is a code patch. When the cause of the abort is a code patch (Step 1300: YES), the abort handler 204 write-protects the page including the instruction address where the abort occurred (Step 1302). Afterwards, the abort handler 204 ends the process returning the result indicating 2.

When the cause of the abort is not a code patch (Step 1300: NO), the abort handler 204 determines whether or not the cause of the abort is a write-protection exception (Step 1304). When the cause of the abort is a write-protection exception (Step 1304: YES), the abort handler 204 disables write protection, acquires the address and data for performing the runtime code patch by identifying the write instruction where write protection occurred, and performs runtime code patching (Step 1306). The abort handler 204 then ends the process returning the result indicating 2.

When the cause of the abort is not a write-protection exception (Step 1304: NO), the abort handler 204 determines whether the cause of the abort is either TLH allocation or an asynchronous GC check (Step 1308). When the cause of the abort is either TLH allocation or an asynchronous GC check (Step 1308: YES), the abort handler 204 ends the process returning the result indicating 1.

When the cause of the abort is neither TLH allocation nor an asynchronous GC check (Step 1308: NO), the abort handler 204 determines whether the cause of the abort is either JIT compilation or class loading (Step 1310). When the cause of the abort is neither JIT compilation nor class loading (Step 1310: NO), the process continues at Step 520 in the flowchart shown in FIG. 5 (*b*). When the cause of the abort is either JIT compilation or class loading (Step 1310: YES), the abort handler 204 determines whether the non-tx-once flag has been set for the current transaction block (Step 1312).

When the non-tx-once flag has not been set (Step 1312: NO), the abort handler 204 sets the non-tx-execution flag for the thread currently being executed. When the non-tx-once flag has been set (Step 1312: YES), the abort handler 204 disables the current transaction block (Step 1316). After Step 1314 or Step 1316, the abort handler 204 ends the process returning the result indicating 1.

Figure 14:
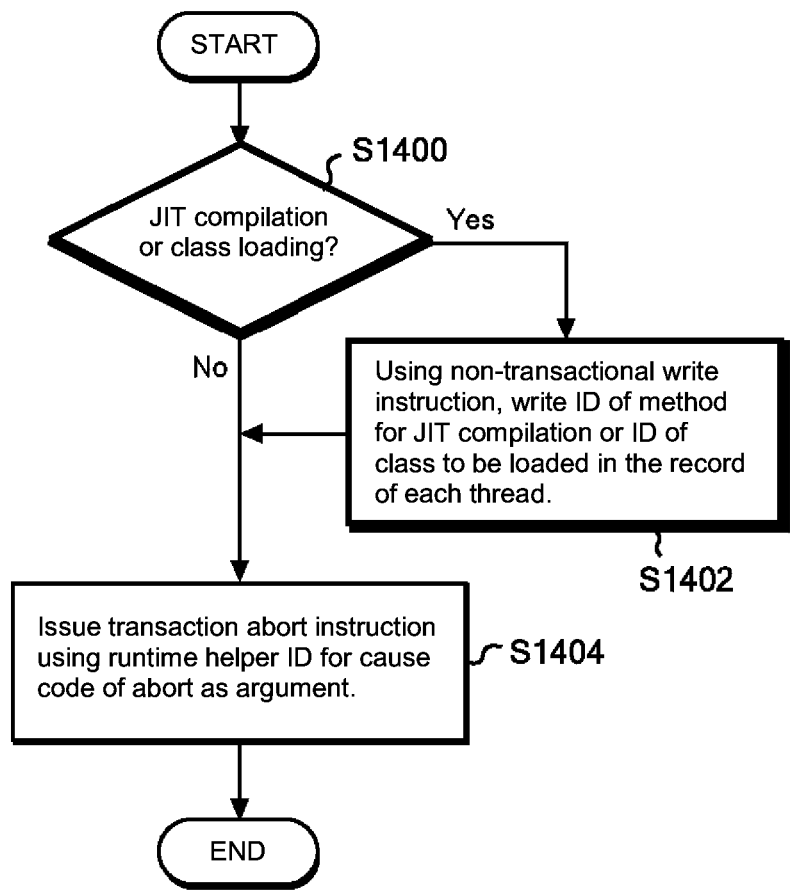
FIG. 14 is a flowchart showing another example of the processing flow for a runtime helper.
Figure 15:
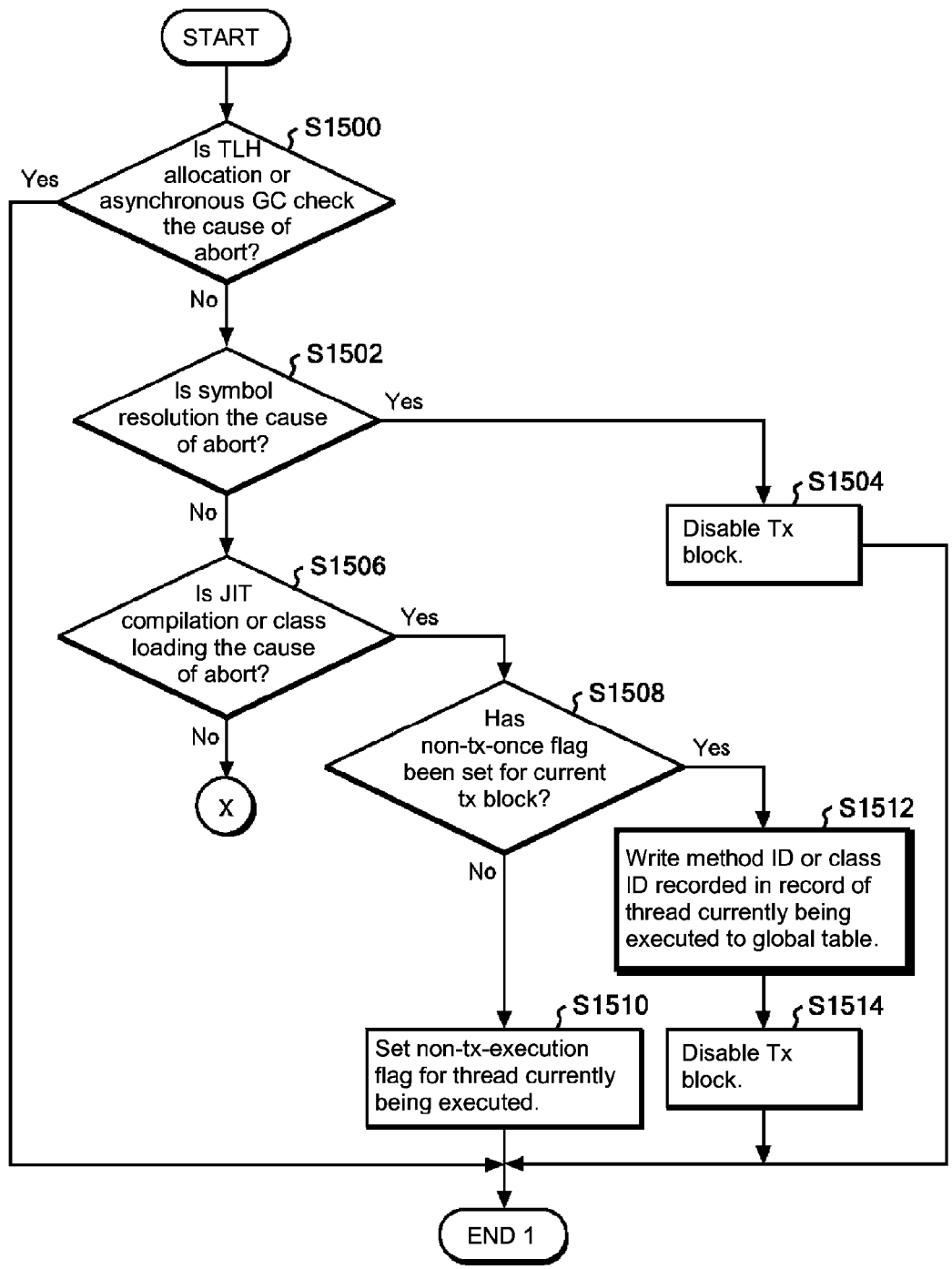
FIG. 15 is a flowchart showing another example of a portion of the processing flow for an abort handler.
Figure 16:
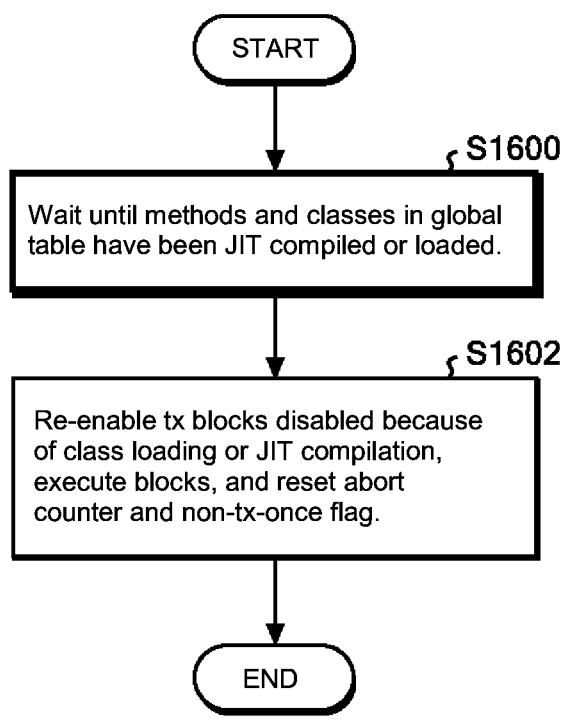
FIG. 16 is a flowchart showing another example of the processing flow for enabling a transaction block.

The following is an explanation of the abort reducing process in the sixth embodiment with reference to FIG. 3, FIG. 5 (*b*), FIG. 6, FIG. 14, FIG. 15 and FIG. 16. Further explanation of the steps in the flowcharts other than FIG. 14, FIG. 15 and FIG. 16 has been omitted, because these steps have already been explained with reference to the first embodiment. FIG. 14 is a flowchart showing another example of the processing flow for an abort-prone runtime helper 219 in Step 312 of the flowchart in FIG. 3. FIG. 15 is a flowchart showing another example of the first half of the processing flow for an abort handler 204 in Step 316 of the flowchart in FIG. 3. FIG. 16 is a flowchart showing another example of the processing flow for enabling a transaction block.

The flowchart in FIG. 14 starts at Step 1400, where the abort-prone runtime helper 219 determines whether the processing content is JIT compilation or class loading. When the processing content is JIT compilation or class loading (Step 1400: YES), the abort-prone runtime helper 219 uses a non-transactional write instruction to write the ID of the method to be JIT-compiled or the ID of the class to be loaded in the memory area of the thread currently being executed (Step 1402).

When the processing content is not JIT compilation or class loading (Step 1400: NO), the abort-prone runtime helper 219 issues a transaction abort instruction using the ID indicating the type of abort-prone runtime helper 219 as the argument indicating the cause of the abort. Afterwards, the abort-prone runtime helper 219 ends the process (Step 1404). The abort-prone runtime helper 219 then ends the process.

The flowchart in FIG. 15 starts at Step 1500, where the abort handler 204 determines whether the cause of the abort is either TLH allocation or an asynchronous GC check. When the cause of the abort is either TLH allocation or an asynchronous GC check (Step 1500: YES), the abort handler 204 ends the process returning the result indicating 1.

When the cause of the abort is neither TLH allocation nor an asynchronous GC check (Step 1500: NO), the abort handler 204 determines whether the cause of the abort is symbol resolution (Step 1502). When the cause of the abort is symbol resolution (Step 1502: NO), the abort handler 204 immediately disables the current transaction block (Step 1504), and ends the process returning the result indicating 1.

When the cause of the abort is not symbol resolution (Step 1502: NO), the abort handler 204 determines whether the cause of the abort is either JIT compilation or class loading (Step 1506). When the cause of the abort is neither JIT compilation nor class loading (Step 1506: NO), the process continues at Step 520 in the flowchart shown in FIG. 5 (*b*). When the cause of the abort is either JIT compilation or class loading (Step 1506: YES), the abort handler 204 determines whether the non-tx-once flag has been set for the current transaction block (Step 1508).

When the non-tx-once flag has not been set (Step 1508: NO), the abort handler 204 sets the non-tx-execution flag for the thread currently being executed (Step 1510). When the non-tx-once flag has been set (Step 1508: YES), the abort handler 204 writes the method ID or class ID recorded in the memory area of the thread currently being executed (Step 1512). The abort handler 204 then disables the current transaction block (Step 1514). After Step 1510 or Step 1514, the abort handler 204 ends the process returning the result indicating 1.

The flowchart in FIG. 16 starts at Step 1600, where the executing unit 208 waits for all of the methods or all of the classes in the global table to be JIT-compiled or loaded. The executing unit 208 then re-enables all of the transaction blocks that were disabled because of JIT compiling or class loading, and resets all of the corresponding execution counters, abort counters and non-tx-once flags (Step 702). The executing unit 208 then ends the process.

Figure 17:
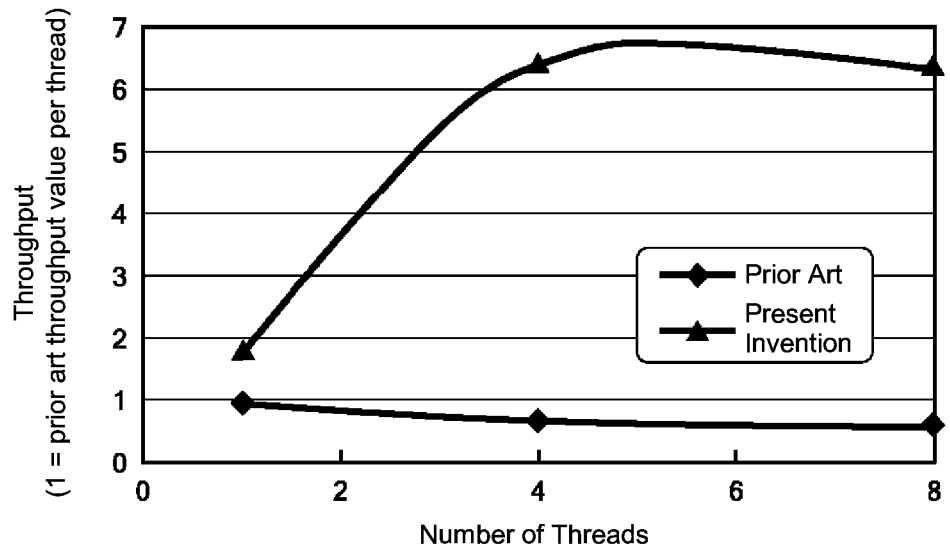
FIG. 17 (a) is a graph showing the results of a test in which the throughput per number of threads in the prior art and in the present invention were compared.
Figure 17:
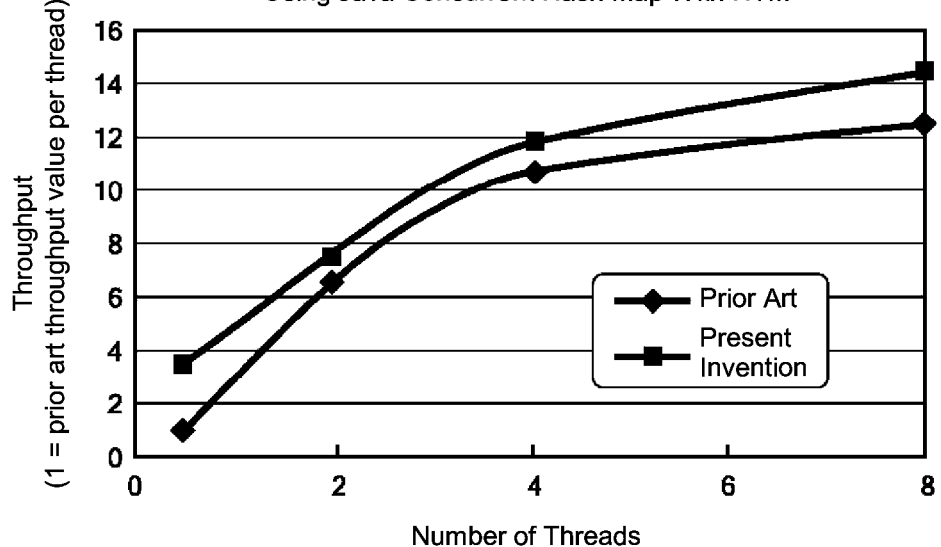

The following is an explanation of test results with reference to FIG. 17. FIG. 17 (*a*) is a graph showing the results of an evaluation of the abort reducing method of the present invention on a four-core zEC12 machine using a micro benchmark to increment the counters. FIG. 17 (*b*) is a graph showing the results of an evaluation of the abort reducing method of the present invention on a 16-core zEC12 machine using a Java (registered trademark) concurrent hash map with HTM. In both graphs, the horizontal axis indicates the number of threads, and the vertical axis indicates the throughput. The throughput value for a single thread when the prior art method is applied is set at 1.

The abort reducing method of the present invention used in the test was the abort reducing method in the third embodiment. The prior art method used for the sake of comparison was a technique described in Non-patent Literature 1, in which several retries are performed when a transaction is aborted and, if an abort still occurs, the transaction is tried again after running the non-transaction path. The test results in FIG. 17 (a) indicate a performance reduction of 89% when the present invention is not used, and test results in FIG. 17 (b) indicate a performance reduction of 13% when the present invention is not used. This is because JIT compilation and runtime code patching continue to occur during transactions, and the transactions continue to be aborted when the present invention is not used.

The present invention was explained using embodiments, but the technical scope of the present invention is not limited to the embodiments described above. The possibility of many changes and improvements to these embodiments should be apparent to those skilled in the art. For example, in the third embodiment, when the abort-prone runtime helper 219 called during a transaction is a JIT compiler 220 or symbol resolver 228, execution is delayed, and performed inside the abort handler 204. However, information required to execute a similar method may be recorded, and execution performed in by executing unit 208 subsequent to the processing performed by the abort handler instead of inside the abort handler. Therefore, embodiments including these changes and improvements are also within the technical scope of the present invention.

The order of execution for operations, steps and processes in the devices, systems, programs and methods described in the claims, specification and drawings was described using such terms as "previous" and "prior". However, these operations, steps and processes can be realized in any order as long as the output of the previous process is used by the subsequent process. Also, even when there are situations in which the output of the previous process is used by the subsequent process, there may be situations in which another process is inserted between the previous process and the subsequent process. Even when another process is inserted between them, there may be a modification in which the previous process is performed immediately prior to the subsequent process. The operational flow in the claims, description and drawing were explained using terms such as "first", "next" and "then" for the sake of convenience. However, the operational flow does not necessarily have to be executed in this order.

The invention claimed is:

1. An abort reducing method for a computer to reduce the number of aborts while running a program using hardware transactional memory, the abort reducing method comprising the steps of:
   (a) the computer running a runtime helper in response to a call to the runtime helper during execution of a transaction block;
   (b) the computer running an abort handler in response to an abort caused by the call to the runtime helper; and
   (c) the computer running a non-transactional path corresponding to the transaction block after the abort handler in (b) has been run;
   the execution of the runtime helper including the process of passing ID information indicating the type of runtime helper to the abort handler; and the execution of the abort handler including the processes of acquiring the ID information of the runtime helper causing the abort and disabling the transaction block with respect to a specific type of runtime helper.

2. The abort reducing method according to claim 1, wherein the process of disabling the transaction block with respect to the specific type of runtime helper further comprises the processes of: disabling the transaction block unconditionally with respect to a first type of runtime helper unexecutable even on a non-transactional path; and disabling the transaction block with respect to a second type of runtime helper executable on a non-transactional path on condition that the second type of runtime helper is not called even once during execution of the non-transactional path.

3. The abort reducing method according to claim 2, wherein the first type of runtime helper includes runtime code patching, and the second type of runtime helper includes runtime compilation and class loading.

4. The abort reducing method according to claim 3 further comprises the step of (d) the computer re-enabling the transaction block in response to a program reaching a steady state in a case where the transaction block was conditionally disabled.

5. The abort reducing method according to claim 3, wherein running of the runtime helper includes, in a case where the runtime helper is the second type of runtime helper, the processes of: recording the processing content using a non-transaction write instruction, and running a transaction abort instruction with the ID information as the argument; and the running of the abort handler includes, in a case where the transaction block has been disabled with respect to the second type of runtime helper, registering the recorded processing content in a table; the abort reducing method further comprising the step of (e) the computer re-enabling the transaction block in response to the processing content registered in the table having been run.

6. The abort reducing method according to claim 5, wherein the processing content is identification information for a method to be compiled in a case where the second type of runtime helper is runtime compilation, and the processing content is an identifier of a class to be loaded in a case where the second type of runtime helper is class loading.

7. The abort reducing method according to claim 3, wherein the abort handler determines that thread-local heap allocation and asynchronous garbage collection checks are not among the specific types of runtime helper.

8. The abort reducing method according to claim 1 further comprising the steps of: (f) the computer disabling all of transaction blocks at the start of program execution; and (g) the computer enabling all of the transaction blocks in response to a predetermined period of time having elapsed after the start of program execution.

9. The abort reducing method according to claim 1, wherein running of the runtime helper includes the process of issuing a transaction abort instruction; and passing the ID information to the abort handler includes the process of using the ID information as the argument of the transaction abort instruction.

10. The abort reducing method according to claim 1, wherein passing the ID information to the abort handler includes the process of recording the ID information using a non-transactional write instruction, and the runtime helper performs the essential runtime helper processing after this process.

11. The abort reducing method according to claim 1, wherein running of the runtime helper includes the process of recording the information required for execution using a non-transactional write instruction on condition that the runtime helper is a type of runtime helper other than the specific types; and the running of the abort handler includes the process of running the other type of runtime helper using the recorded required information; the abort reducing method further comprising the step of (h) the computer rerunning the transaction block after these processes instead of (c).

12. The abort reducing method according to claim 1, wherein running of the runtime helper includes the process of recording the information required for execution using a non-transactional write instruction on condition that the runtime helper is a type of runtime helper other than the specific types, and the process of canceling the execution; the abort reducing method further comprising the step of (i) the computer running the other type of runtime helper using the recorded required information after the transaction block has been run.

13. The abort reducing method according to claim 11, wherein the specific types of runtime helper include class loading, the other type of runtime helper is runtime compilation, and the required information is identification information for the method to be compiled.

14. The abort reducing method according to claim 11, wherein the specific types of runtime helper include class loading, the other type of runtime helper is runtime code patching, and the required information is the address and data for runtime code patching.

15. The abort reducing method according to claim 1, wherein running of the runtime helper, in a case where the runtime helper is runtime compilation, includes the process of replacing a runtime code patching call in a transaction block included in the code to be compiled with a transaction abort instruction, and creating a correspondence table for the information required for the runtime code patching from an address in the transaction abort instruction; the abort reducing method further comprising the step of (j) the computer rerunning the transaction block after running the abort handler in response to the execution of the replaced transaction abort instruction; and the running of the abort handler including the process of performing a runtime code patch by consulting the correspondence table and acquiring the required information from the address of the transaction abort instruction, and overwriting the transaction abort instruction with an nop instruction.

16. The abort reducing method according to claim 1, wherein running the abort handler includes, on condition that the runtime helper is runtime code patching, write-protecting the page including the instruction address in which the abort occurred, disabling the write protection on condition that the cause of the abort is a write-protection exception, acquiring the address and data for the runtime code patch by identifying the write instruction at the write-protected location, and performing the runtime code patch; the abort reducing method further comprising the step of (k) the computer rerunning the transaction block instead of (c) after the write protection or runtime code patch performed by the abort handler.

17. A hardware memory storing an abort reducing program that, when executed by at least one processor, causes a computer to run each step of the abort reducing method according to claim 1.

18. An abort reducing apparatus including at least one processor programmed for running in a computer each step of the abort reducing method according to claim 1.

19. An abort reducing apparatus for reducing the number of aborts while running a program using hardware transactional memory, the abort reducing apparatus comprising:
at least one processor comprising hardware, the at least one processor configured to implement:
an executing unit,
a plurality of runtime helpers, and
an abort handler;
each of the runtime helpers performing the process of passing ID information indicating the type of runtime helper to the abort handler in response to being called during execution of a transaction block by the executing unit;
the abort handler acquiring the ID information of the runtime helper which caused an abort, and disabling the transaction block with respect to a specific type of runtime helper; and
the executing unit executing a non-transactional path corresponding to the transaction block after the abort handler processing caused by calling the runtime helper.

20. The abort reducing apparatus according to claim 19, wherein the process of disabling the transaction block with respect to a specific type of runtime helper further includes the processes of:
disabling the transaction block unconditionally with respect to a first type of runtime helper unexecutable even on a non-transactional path;
and disabling the transaction block with respect to a second type of runtime helper executable on a non-transactional path on condition that the second type of runtime helper is not called even once during execution of the non-transactional path;
the executing unit re-enabling the transaction block in response to a program reaching a steady state in a case where the transaction block was conditionally disabled.

* * * * *